US009598167B2

(12) United States Patent
Grip et al.

(10) Patent No.: US 9,598,167 B2
(45) Date of Patent: Mar. 21, 2017

(54) MORPHING AIRFOIL LEADING EDGE

(71) Applicant: The Boeing Company, Chicago, IL (US)

(72) Inventors: Robert E. Grip, Rancho Palos Verdes, CA (US); John J. Brown, Costa Mesa, CA (US); Neal A. Harrison, San Clemente, CA (US); Blaine K. Rawdon, San Pedro, CA (US); John C. Vassberg, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 419 days.

(21) Appl. No.: 14/196,461

(22) Filed: Mar. 4, 2014

(65) Prior Publication Data
US 2016/0009372 A1   Jan. 14, 2016

(51) Int. Cl.
B64C 9/24 (2006.01)
B64C 3/26 (2006.01)
B64C 3/28 (2006.01)
B64C 3/48 (2006.01)
B64C 3/38 (2006.01)
B64C 3/44 (2006.01)

(52) U.S. Cl.
CPC ............... B64C 9/24 (2013.01); B64C 3/26 (2013.01); B64C 3/28 (2013.01); B64C 3/38 (2013.01); B64C 3/48 (2013.01); B64C 2003/445 (2013.01); Y02T 50/145 (2013.01)

(58) Field of Classification Search
CPC .... B64C 3/48; B64C 3/50; B64C 3/52; B64C 2003/445; B64C 2003/543; B64C 9/22; B64C 9/24
See application file for complete search history.

(56) References Cited

U.S. PATENT DOCUMENTS

| 2,749,060 A | 6/1956 | Brady | |
| 2,763,448 A | 9/1956 | Davie | |
| 3,076,623 A * | 2/1963 | Lyon | B64C 3/50 244/215 |
| 3,244,384 A | 4/1966 | Bracka | |
| 3,556,439 A | 1/1971 | Baumgaertner | |
| 3,698,668 A | 10/1972 | Cole | |
| 3,711,039 A * | 1/1973 | James | B64C 9/22 244/214 |
| 3,716,209 A | 2/1973 | Pierce et al. | |

(Continued)

FOREIGN PATENT DOCUMENTS

DE   102012110805 B3   2/2014
EP       2727825 A1    5/2014

OTHER PUBLICATIONS

EPO, European Search Report for EP14196306 dated Jul. 6, 2015.
U.S. Appl. No. 13/417,201, filed Mar. 9, 2012.

Primary Examiner — Justin Rephann

(57) ABSTRACT

An airfoil may include a leading edge and a shape control mechanism. The leading edge may include a flexible leading edge skin having a first end, a second end, and an arc length defined therebetween. The shape control mechanism may be attached to the flexible leading edge skin at a plurality of support locations and may transition the flexible leading edge skin from a first shape having a first curvature profile to a second shape having a second curvature profile different than the first curvature profile without a change in the arc length.

20 Claims, 15 Drawing Sheets

(56) References Cited

U.S. PATENT DOCUMENTS

| | | | | |
|---|---|---|---|---|
| 3,836,099 A | * | 9/1974 | O'Neill | B64C 3/48 244/214 |
| 3,941,334 A | | 3/1976 | Cole | |
| 3,994,451 A | | 11/1976 | Cole | |
| 3,994,452 A | | 11/1976 | Cole | |
| 4,040,579 A | | 8/1977 | McKinney | |
| 4,113,210 A | | 9/1978 | Pierce | |
| 4,131,253 A | * | 12/1978 | Zapel | B64C 3/48 244/215 |
| 4,159,089 A | | 6/1979 | Cole | |
| 4,171,787 A | | 10/1979 | Zapel | |
| 4,200,253 A | | 4/1980 | Rowarth | |
| 4,252,287 A | | 2/1981 | Zimmer | |
| 4,262,868 A | | 4/1981 | Dean | |
| 4,349,169 A | | 9/1982 | McAnally | |
| 4,351,502 A | | 9/1982 | Statkus | |
| 4,360,176 A | | 11/1982 | Brown | |
| 4,427,168 A | | 1/1984 | McKinney | |
| 4,429,844 A | | 2/1984 | Brown et al. | |
| 4,468,014 A | | 8/1984 | Strong | |
| 4,553,722 A | | 11/1985 | Cole | |
| 4,585,192 A | | 4/1986 | Clifford-Jones | |
| 4,650,140 A | | 3/1987 | Cole | |
| 4,706,913 A | | 11/1987 | Cole | |
| 5,158,252 A | | 10/1992 | Sakurai | |
| 5,332,178 A | * | 7/1994 | Williams | B29C 70/446 244/117 R |
| 5,879,767 A | | 3/1999 | Matsushima | |
| 6,076,776 A | | 6/2000 | Breitbach et al. | |
| 6,213,433 B1 | * | 4/2001 | Gruensfelder | B64C 3/48 244/134 R |
| 6,375,126 B1 | | 4/2002 | Sakurai | |
| 6,491,262 B1 | * | 12/2002 | Kota | B64C 3/48 244/219 |
| 6,796,534 B2 | * | 9/2004 | Beyer | B64C 3/48 244/214 |
| 7,114,879 B2 | | 10/2006 | Obermeyer | |
| 7,716,958 B2 | | 5/2010 | Martin | |
| 7,798,443 B2 | | 9/2010 | Hamilton et al. | |
| 8,042,772 B2 | | 10/2011 | Lutke | |
| 8,256,719 B2 | | 9/2012 | Wood et al. | |
| 8,342,447 B2 | | 1/2013 | Etling | |
| 8,534,611 B1 | * | 9/2013 | Pitt | B64C 3/48 244/214 |
| 8,925,870 B1 | * | 1/2015 | Gordon | B64C 3/28 244/200 |
| 2009/0272853 A1 | * | 11/2009 | Raudszus | B64C 3/50 244/214 |
| 2009/0302168 A1 | * | 12/2009 | Hetrick | B64C 3/48 244/214 |
| 2010/0133387 A1 | * | 6/2010 | Wood | B64C 3/48 244/219 |
| 2011/0017876 A1 | * | 1/2011 | Manley | B64C 3/48 244/219 |
| 2012/0104181 A1 | * | 5/2012 | Rix | B64C 3/48 244/219 |

* cited by examiner

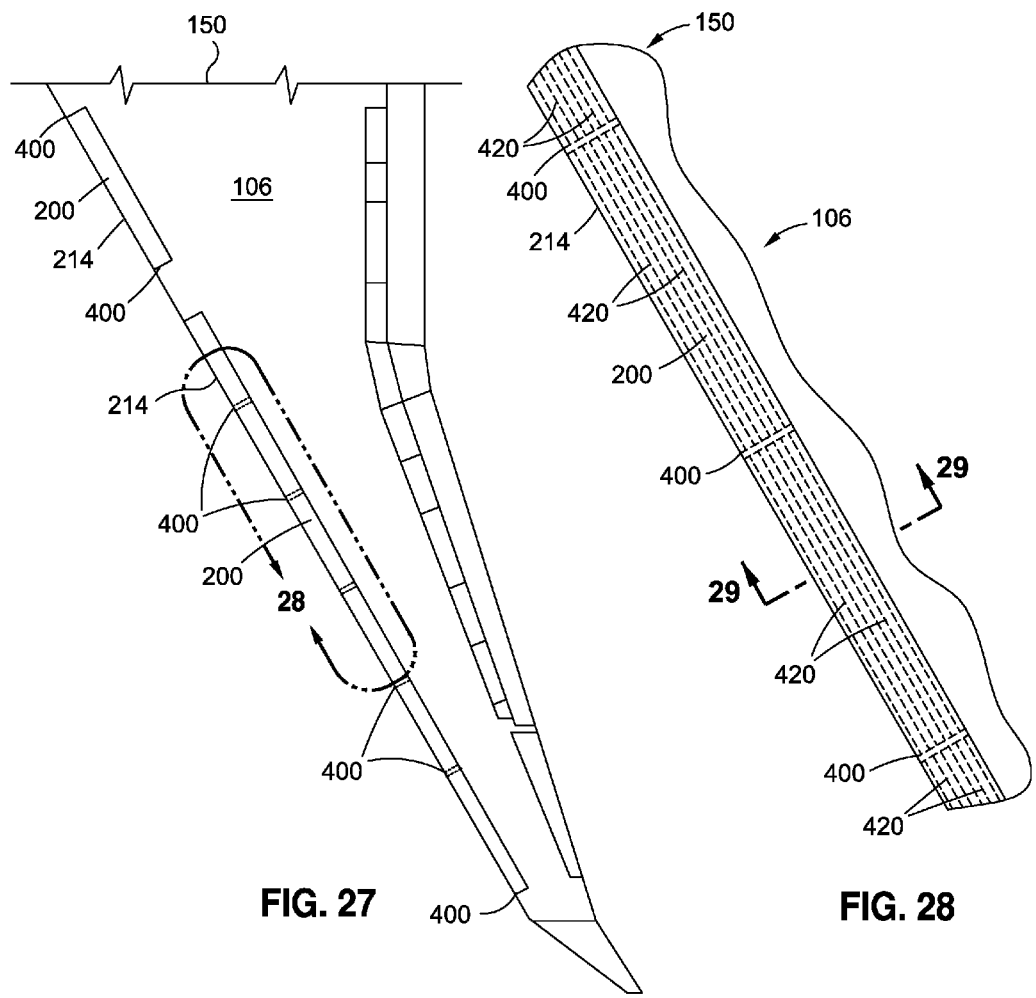
FIG. 27  FIG. 28
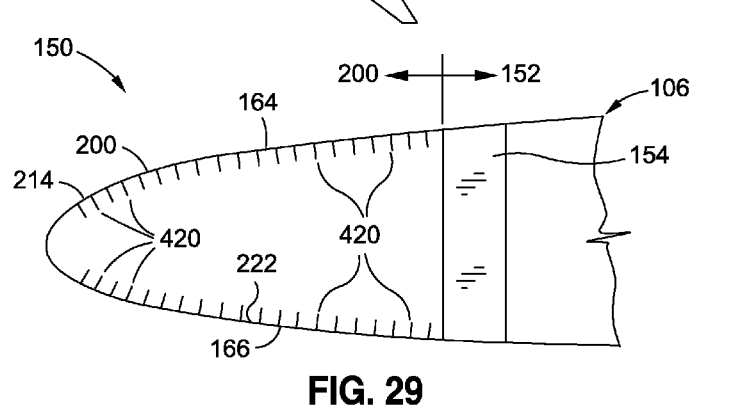
FIG. 29

MORPHING AIRFOIL LEADING EDGE

FIELD

The present disclosure relates generally to airfoils and, more particularly, to a system and method of morphing an airfoil leading edge between different shapes.

BACKGROUND

Aircraft typically include a variety of devices for improving the aerodynamic performance of the aircraft during different phases of flight. For example, an aircraft may include leading edge devices mounted to the wing leading edges and which may be deployed during the takeoff, approach, and/or in the landing phase of a flight, and may be retracted during the cruise phase of a flight. By deploying the leading edge devices, airflow may be maintained over the wings at high angles of attack which may allow for a decrease in the speed of an aircraft during takeoff or an increase in the descent angle during approach and/or a reduction in landing speed.

Unfortunately, leading edge devices of conventional aircraft have geometric features that disrupt the flow of air over the wings even when retracted such as during the cruise phase of a flight. For example, conventional leading edge devices may include a step between the aft edge of the leading edge device and the main wing portion when the leading edge device is retracted. When the leading edge device is deployed, a gap may exist between the leading edge device and the main wing portion. The steps and gaps associated with conventional leading edge devices may cause laminar flow to transition to non-laminar flow over the airfoil. The transition to non-laminar flow may reduce the aerodynamic performance of the aircraft. In addition, steps and gaps associated with conventional leading edge devices may generate noise that may add to the aircraft noise during takeoff and landing. Furthermore, steps and gaps associated with conventional leading edge devices may cause vibration and flutter which, over time, may have an undesirable effect on actuating mechanisms for leading edge devices.

As can be seen, there exists a need in the art for a leading edge of an airfoil that may reduce or avoid the existence of geometric features causing laminar flow to transition to non-laminar flow.

SUMMARY

The above-noted needs associated with airfoils are specifically addressed by the present disclosure which provides an airfoil having a leading edge and a shape control mechanism. The leading edge may include a flexible leading edge skin having a first end, a second end, and an arc length defined therebetween. The shape control mechanism may be attached to the flexible leading edge skin at a plurality of support locations. The shape control mechanism may transition the flexible leading edge skin from a first shape having a first curvature profile to a second shape having a second curvature profile different than the first curvature profile without a change in the arc length.

In addition, disclosed is a method of morphing a leading edge of an airfoil. The method may include controlling a shape control mechanism which may be attached to a flexible leading edge skin of the airfoil at a plurality of support locations of a leading edge skin. The method may additionally include transitioning the flexible leading edge skin from a first shape having a first curvature profile to a second shape having a second curvature profile that may be different than the first curvature profile. The change from the first shape to the second shape may result in a change in the camber of the airfoil. For some portions of the arc length, the local curvature may be greater when the leading edge skin is in the first shape than the local curvature when the leading edge skin is in the second shape. For other portions of the arc length, the local curvature may be less when the leading edge skin is in the first shape than the local curvature when the leading edge skin is in the second shape. The method may also include maintaining a same arc length of the leading edge skin during the transition of the flexible leading edge skin from the first shape to the second shape.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 27 is a plan view of an aircraft wing having a plurality of shape control mechanisms located at spaced intervals along a spanwise direction;

FIG. 28 is a plan view of a portion of a leading edge of the aircraft wing taken along line 28 of FIG. 27 and illustrating spanwise stiffeners that may be included on an inner side of the flexible leading edge skin;

FIG. 29 is a sectional view of the aircraft wing taken along line 29 of FIG. 28 and illustrating an embodiment of a leading edge having spanwise stiffeners mounted to the inner side of the flexible leading edge skin;

DETAILED DESCRIPTION

Figure 1:
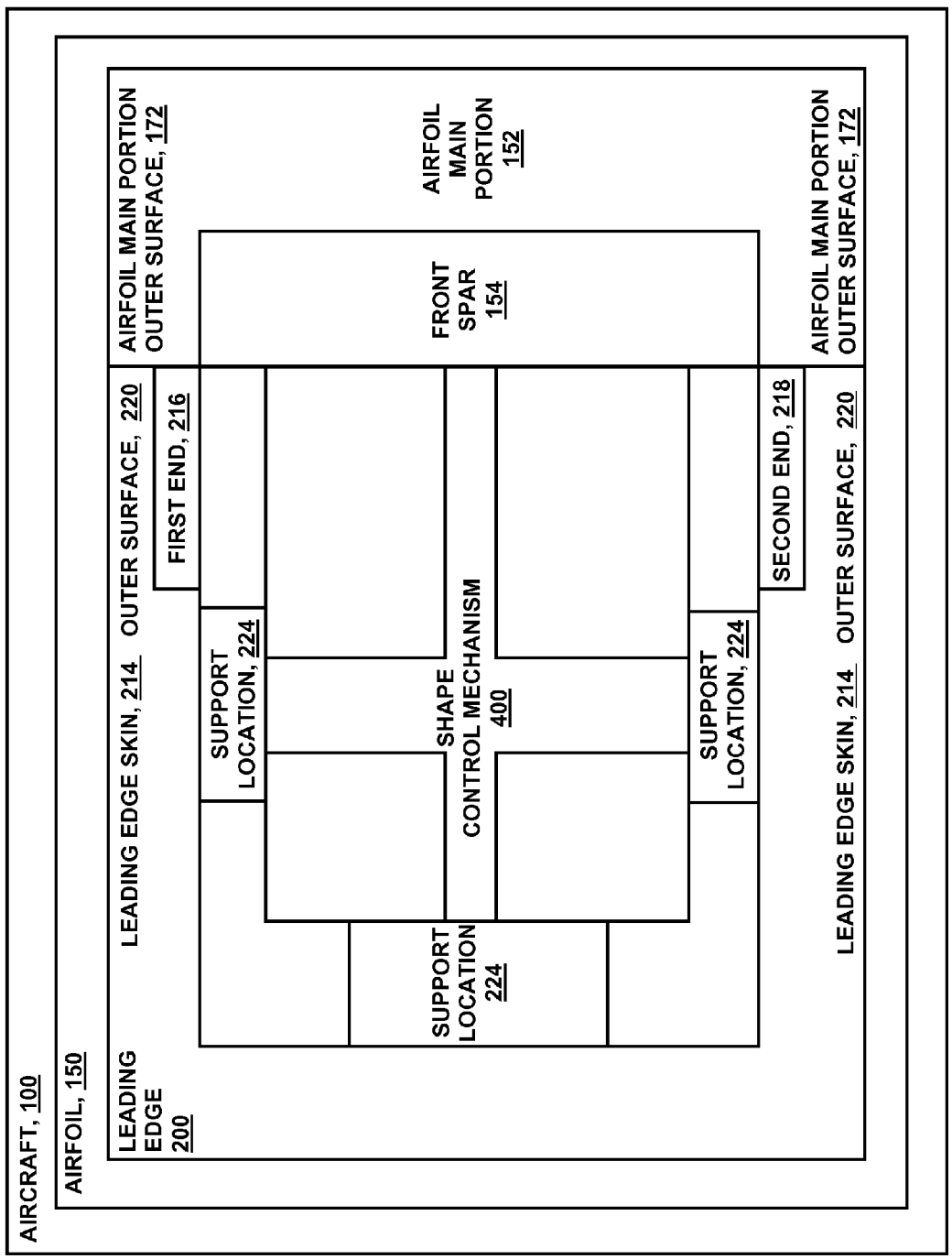
FIG. 1 is a block diagram of an airfoil having a flexible leading edge skin and a shape control mechanism for morphing or transitioning the flexible leading edge skin from a first shape to a second shape.

Referring now to the drawings wherein the showings are for purposes of illustrating various embodiments, shown in FIG. 1 is a block diagram of a leading edge 200 of an airfoil 150. The leading edge 200 may include a flexible leading edge skin 214 having a first end 216, a second end 218, and an arc length defined between the first end 216 and the second end 218. In addition, the leading edge 200 may include a shape control mechanism 400 attached to the flexible leading edge skin 214 at a plurality of support locations 224. The shape control mechanism 400 (FIG. 4) may be configured to morph or transition the flexible leading edge skin 214 from a first shape 228 having a first curvature profile 230 (FIG. 3) to a second shape 232 having a second curvature profile 234 that may be different than the first curvature profile 230. The change from the first shape 228 to the second shape 232 may occur without a change in the arc length of the flexible leading edge skin 214. The shape control mechanism 400 may also be configured to morph the leading edge 200 into any one of a variety of third shapes intermediate the first shape 228 and the second shape 232. In an embodiment, the shape control mechanism 400 may be mounted to an airfoil main portion 152 located adjacent to the leading edge 200, and may include one or more arms or links that may be attached to discrete support locations 224 of the flexible leading edge skin 214.

In some examples, the first end 216 and/or the second end 218 of the flexible leading edge skin 214 may be fixedly coupled to the airfoil main portion 152. In other examples, the first end 216 and/or the second end 218 of the leading edge skin 214 may be integral with the forward ends (not shown) of a skin member (not shown) of the airfoil main portion 152 on the first side 160 and/or the second side 162 of the airfoil main portion 152. The first end 216 and the second end 218 of the flexible leading edge skin 214 may be described as the location where the flexible leading edge skin 214 transitions to the airfoil main portion 152 and may not necessarily be the locations where the flexible leading edge skin 214 physically terminates. Regardless of the configuration of the leading edge skin 214 and the manner in which the first end 216 and the second end 218 transition to the airfoil main portion 152, the outer surface 220 of the flexible leading edge skin 214 may be continuous with the outer surfaces 172 (FIG. 4) of the airfoil main portion 152 on the first side 160 and/or the second side 162 of airfoil main portion 152. The leading edge skin 214 may provide a non-interrupted, smooth, outer surface 220 that is continuous with the outer surfaces 172 of the airfoil main portion 152 on the first side 160 (e.g., an upper side) and/or on the second side 162 (e.g., a lower side) of the airfoil main portion 152.

The flexible leading edge skin 214 may transition between the first shape 228 and the second shape 232 in a manner avoiding steps, gaps, breaks, or discontinuities in the surface of the leading edge 200 and airfoil main portion 152 on either side of the leading edge 200. Such steps, gaps, breaks, or discontinuities may undesirably cause airflow over the leading edge 200 and airfoil main portion 152 to transition from laminar flow to non-laminar flow and which may reduce the aerodynamic performance of an airfoil and/or increase the noise generated by the airfoil. The flexible leading edge 200 may remain continuous and avoid steps, gaps, and/or breaks while the flexible leading edge skin 214 morphs within a fixed arc length to vary the shape of the leading edge 200 during the transition of the leading edge 200 between the first shape 228 and the second shape 232, or any shape therebetween. Laminar flow may be provided on both sides of the airfoil 150 (e.g., on the upper side and the lower side) due to the avoidance of steps, gaps, and/or discontinuities.

The various embodiments may improve the aerodynamics of the airfoil 150 and/or the leading edge 200 in different flight regimes and with different shapes of the airfoil 150. For example, the embodiments disclosed herein may improve the aerodynamics of an airfoil 150 in a high-speed/low-lift coefficient flight regime, and in a low-speed/high-lift coefficient flight regime. The leading edge 200 may transition between a cruise profile (e.g., a first shape 230) having a relatively small leading edge radius that may be advantageous for high-speed cruise flight, and a drooped profile (e.g., a second shape 232) having a relatively large leading edge radius that may be advantageous for low-speed flight such as during take-off, approach, and/or landing.

By avoiding steps, gaps, discontinuities, edges, and/or sharp or abrupt changes in the curvature, slope, and/or profile of both surfaces of an airfoil, the examples of the morphing leading edge disclosed herein may generate a reduced amount of noise relative to conventional leading edge devices. Furthermore, the embodiments disclosed herein may reduce or avoid vibration and flutter associated with airflow over steps, gaps, or edges of conventional leading edge devices. In addition, the embodiments disclosed herein may eliminate the need for external leading edge supports associated with conventional leading edge devices. The avoidance and/or elimination of steps, gaps, edges, and external supports in the presently disclosed examples may result in an improvement in low-speed performance of the aircraft by reducing the magnitude of negative pressure on the upper side of the leading edge, and thereby delay flow separation and stall of an airfoil at high angles of attack.

Figure 2:
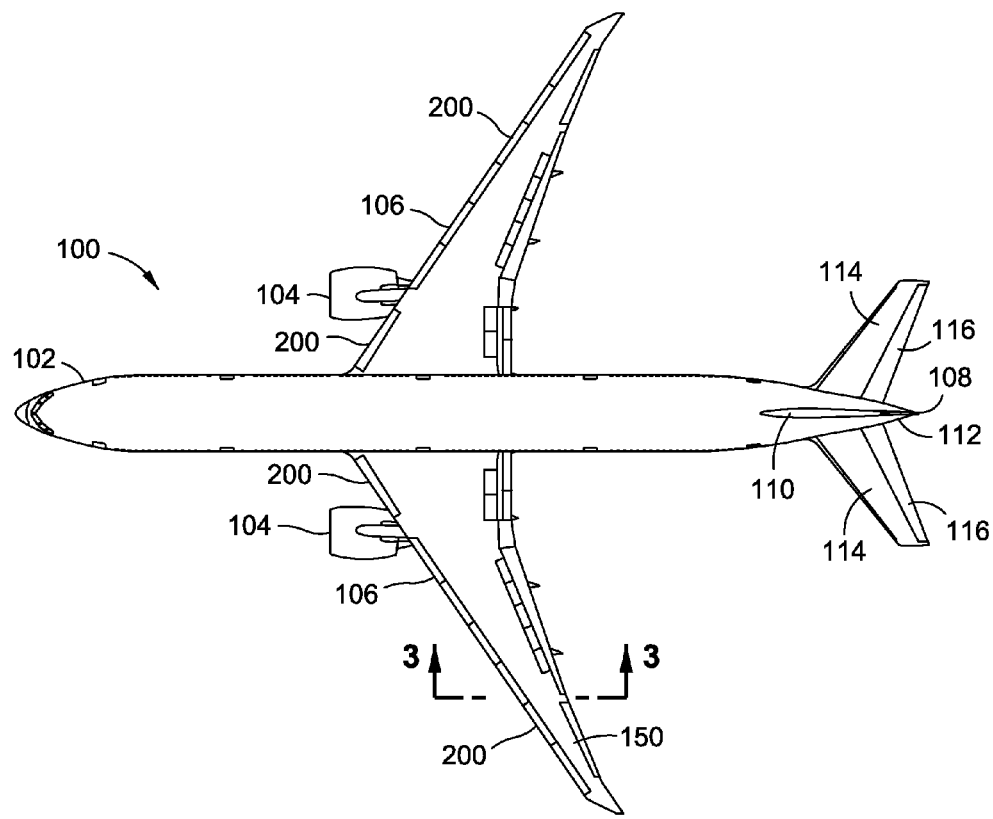
FIG. 2 is a plan view of an example of an aircraft that may include an embodiment of a leading edge as disclosed herein.

FIG. 2 shows an example of an aircraft 100 that may include one or more leading edges 200 as disclosed herein. The aircraft 100 may include a fuselage 102 having a pair of wings 106 attached to the fuselage 102 at a wing root and extending outwardly toward a wing tip. One or more propulsion units 104 may be mounted on the wings 106. The aircraft 100 may include an empennage 108 including a horizontal stabilizer 114 and elevator 116, and a vertical stabilizer 110 and rudder 112 for directional control of the aircraft 100. The aircraft 100 may include one or more of the disclosed leading edges 200 on the wings 106. In some examples, one or more of the disclosed leading edges 200 may be implemented on airfoils other than on the wings 106 of an aircraft 100.

Although the disclosed leading edge 200 is described in the context of a tube-and-wing aircraft 100 as shown in FIG. 2, the leading edge 200 may be implemented in any aircraft configuration, without limitation, including a blended wing configuration, a hybrid wing-body configuration, and other aircraft configurations. One or more of the disclosed examples may also be implemented on a leading edge of a nacelle (not shown) of an engine inlet, allowing portions of the nacelle leading edge to morph into a drooped shaped as a means to delay or avoid flow separation at high angles of attack. The leading edge 200 may also be implemented in vehicles other than aircraft. For example, the leading edge 200 may be implemented on missiles, rockets, rotorcraft, and on rotor blades and propellers. In this regard, the disclosed leading edge 200 may be implemented in any vehicular application, without limitation, including any marine, land, air, and/or space vehicle. The disclosed leading edge 200 may also be implemented on any non-vehicular application such as on the blades of a wind turbine or in building structures such as on a south-facing overhang on a building that may morph to provide shade against the sun.

Figure 3:
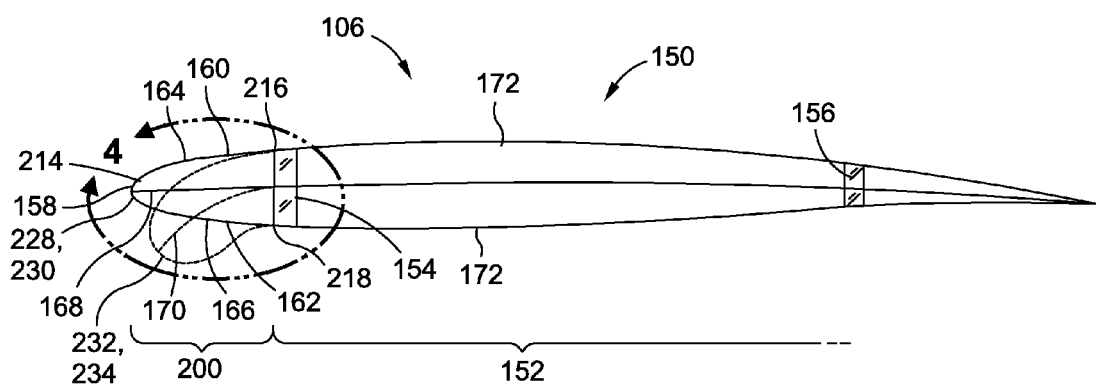
FIG. 3 is a sectional view of a wing taken along line 3 of FIG. 2 and illustrating an embodiment of a leading edge transitioning from a first shape having a first curvature profile to a second shape having a second curvature profile without a change in the arc length of the flexible leading edge skin.

FIG. 3 shows a cross section of an airfoil 150 such as a wing 106 of an aircraft 100. In the embodiment shown, the wing 106 may include a front spar 154 and an aft spar 156 which may define a wing box of the wing 106. The airfoil 150 may include a first side 160 defining a wing upper surface 164, and a second side 162 defining a wing lower surface 166. In FIG. 3, the leading edge 200 is shown as a solid line in a first shape 228 having a first curvature profile 230 which may be described as a high-speed cruise profile. The flexible leading edge skin 214 may transition to a second shape 232 shown as a dashed line and having a second curvature profile 234 which may be described as a low-speed, high-lift profile. The flexible leading edge skin 214 may transition from the first shape 228 to the second shape 232, and any shape in between, without a change in the arc length of the flexible leading edge skin 214.

In FIG. 3, the airfoil 150 shown has a camber line and a thickness profile that may change as the flexible leading edge skin 214 transitions between the first shape 228 and the second shape 232. As known in the art, the camber line of an airfoil extends along the vertical center of the airfoil and is equidistant from the top surface and the bottom surface of the airfoil from the leading edge to the trailing edge. In some examples, the camber may increase (i.e., may become more sharply curved) as the flexible leading edge skin 214 transitions from the first shape 228 to the second shape 232. For example, in FIG. 3, the airfoil 150 may change from a relatively shallow curvature first camber 168 when the leading edge 200 is in the first shape 228, to an increased curvature (i.e., smaller radius) second camber 170 at the leading edge when the leading edge 200 is in the second shape 232. In addition, the thickness profile may change as the leading edge skin 214 transitions from the first shape 228 to the second shape 232. For example, the leading edge 200 may change from a relatively narrow profile of the leading edge skin 214 in the first shape 228 to a relatively blunt profile of the leading edge skin 214 in the second shape 232. Although described in the context of a leading edge 200 morphing from a relatively small-radius first shape 228 for a high-speed flight regime, to a relatively large-radius second shape 232 for a low-speed flight regime, the leading edge 200 may be configured to transition between any one of a variety of different shapes or geometries, without limitation, and for any flight regimes, and is not limited to transitioning between a small-radius first shape 228 and a large-radius second shape 232 for a respective high-speed flight regime and low-speed flight regime.

Figure 4:
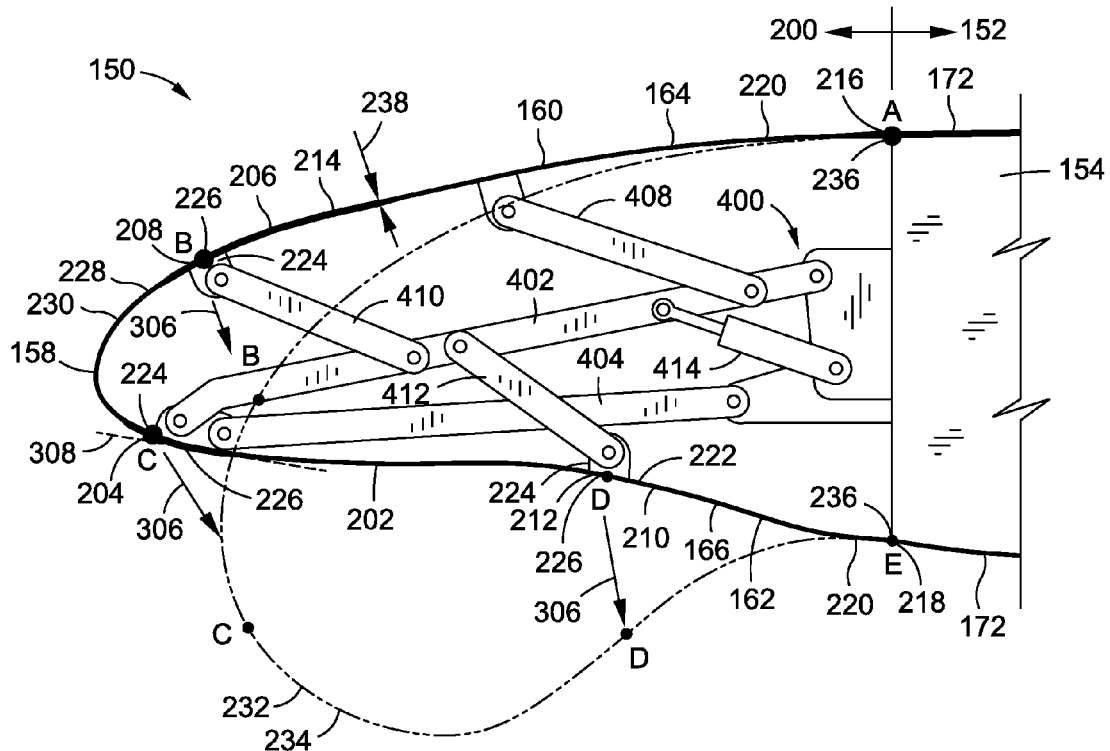
FIG. 4 is a sectional view of a leading edge taken along line 4 of FIG. 3 and showing an embodiment of a shape control mechanism attached to the flexible leading edge skin at a plurality of support locations and showing in solid line the flexible leading edge skin in a first shape (e.g., a cruise profile)

FIG. 4 shows an embodiment of a shape control mechanism 400 attached to the flexible leading edge skin 214 which is shown as a solid line in a first shape 228 (e.g., a cruise profile). The second shape 232 of the flexible leading edge skin 214 is shown as a dashed line. The first end 216 and the second end 218 of the flexible leading edge skin 214 may be attached to or integrated with the airfoil main portion 152 located aft of the flexible leading edge skin 214 as indicated above. The first end 216 and/or the second end 218 of the flexible leading edge skin 214 may be tangent to the respective airfoil upper surface 164 and airfoil lower surface 166, and may avoid the above-mentioned discontinuities in the surface profile when the flexible leading edge skin 214 transitions between the first shape 228 and the second shape 232. The first end 216 and the second end 218 of the flexible leading edge skin 214 may remain tangent to the respective airfoil upper surface 164 and airfoil lower surface 166 at any shape between the first shape 228 and the second shape 232 during the transition of the flexible leading edge skin 214.

In the embodiment shown, the shape control mechanism 400 may be mounted to the airfoil main portion 152 (FIG. 4). For example, the shape control mechanism 400 may be mounted to the front spar 154 of an airfoil. The shape control mechanism 400 may include one or more arms and/or links extending to the flexible leading edge skin 214. The arms may extend from the airfoil main portion 152 to one or more support locations 224 on the inner side 222 of the flexible leading edge skin 214. The flexible leading edge skin 214 may include one or more mounting tabs extending inwardly from the inner side 222. The ends of the arms may be pivotably attached to the tabs. The tabs on the inner side 222 of the skin may be integrally formed with the flexible leading edge skin 214, or the tabs may be mounted to the flexible leading edge skin 214 such as by mechanically fastening, adhesively bonding, or integrally forming the tabs on the inner side 222 of the flexible leading edge skin 214.

In FIG. 4, the embodiment shown includes a primary or main arm 402 extending from the airfoil main portion 152 to a support location 224 on a forward lower portion 202 of the flexible leading edge skin 214. One end of the main arm 402 may be pivotably coupled to a bracket extending outwardly from the airfoil main portion 152. An opposite end of the main arm 402 may be pivotably coupled to a support location 224 (e.g., point C) of the flexible leading edge skin 214. The main arm 402 may be configured to control the displacement of a forward lower point 204 on the forward lower portion 202 of the flexible leading edge skin 214 during the transition of the leading edge 200 between the first shape 228 and the second shape 232. The shape control mechanism 400 may further include a rotation arm 404 extending from the airfoil main portion 152 to the support location 224 where the main arm 402 is coupled. The rotation arm 404 may be pivoted abut a pivot point to control the slope of the forward lower point 204 (e.g., point C) during the transition of the leading edge 200 between the first shape 228 and the second shape 232.

The shape control mechanism 400 may further include one or more links that may extend from the main arm 402 to the inner side 222 of the flexible leading edge skin 214. For example, in the embodiment shown, the shape control mechanism 400 may include an upper link 410 pivotally coupled to the main arm 402 and extending to a forward upper portion 206 of the flexible leading edge skin 214. The upper link 410 may be configured to control the displacement of a forward upper point 208 (e.g., point B) on the forward upper portion 206. A lower link 412 may be pivotally coupled to the main arm 402 and may extend to a mid lower portion 210 of the flexible leading edge skin 214 at a location between the forward lower portion 202 and the airfoil main portion 152. The lower link 412 may be configured to control the displacement of a mid lower point 212 (e.g., point D) on the mid lower portion 210. In the embodiment shown, the lower link 412 may be coupled to an approximate mid-span location of the main arm 402 at approximately the same location or slightly aft of the location where the upper link 410 is pivotably coupled to the main arm 402. In some examples, the link 412 may connect to the main arm 402 at a location forward of where the link 410 connects to main arm 402.

The shape control mechanism 400 may additionally include a main actuator 414 extending from the airfoil main portion 152 and pivotably coupled to at least one of the arms such as to the main arm 402. The main actuator 414 may be configured to actuate the flexible leading edge skin 214 between the first shape 228 and the second shape 232 by pivoting the main arm 402 about a pivot point. One end of the main actuator 414 may be pivotally mounted to a bracket attached to the airfoil main portion 152. An opposite end of the main actuator 414 may be pivotably coupled to the main arm 402 such as at a location aft of the location where the lower link 412 is pivotally coupled to the main arm 402. The main actuator 414 may be provided in any one of a variety of different configurations including, but not limited to, a hydraulic actuator, an electromechanical actuator, a shape memory alloy actuator, or any one of a variety of other actuator configurations.

It should be noted that the embodiment of the shape control mechanism 400 illustrated in the figures is one example of any one of a variety of different configurations of a shape control mechanism 400 that may be implemented for morphing the leading edge 200 between any number of shapes. In this regard, the shape control mechanism 400 may include any number of arms, links, and/or actuators, without limitation. Regardless of the configuration, the shape control mechanism 400 may be configured to control the displacement and/or the slope of the flexible leading edge skin 214 at one or more of support location 224 of the flexible leading edge skin 214. In the present disclosure, a support location 224 may be described as a location where the flexible leading edge skin 214 has substantially the same curvature when the flexible leading edge skin 214 is in the first shape 228 as in the second shape 232. In some examples, the shape control mechanism 400 may be configured such that at least one of the arms and/or links is attached to the flexible leading edge skin 214 in a manner allowing for displacement only, rotation only, or a combination of displacement and rotation at that location of the flexible leading edge skin 214. Rotation of the flexible leading edge skin 214 may be constrained at some locations and may not be constrained at other locations.

For example, FIG. 4 illustrates five points, A, B, C, D and E, on the leading edge skin 214. Points A and E may be described as constrained locations 236 at the respective first end 216 and second end 218 of the flexible leading edge skin 214. Points B, C, and D may be movably controlled by the shape control mechanism 400. Points B, C, and/or D may each be described as a location of constant curvature 226 (e.g., zero change in curvature) of the flexible leading edge skin 214 during the transition of the leading edge 200 between the first shape 228 and the second shape 232. Point B is located on the upper surface 164 of the flexible leading edge skin 214. The shape control mechanism 400 may include an upper link 410 extending from the main arm 402 to the point B support location 224 to enforce the displacement 306 of point B. Point C is located on a lower surface 166 of the flexible leading edge skin 214 when the leading edge 200 is in the first shape 228 (e.g., high-speed profile). The main arm 402 and the rotation arm 404 of the shape control mechanism 400 may be pivotably coupled to the support location 224 at point C to enforce displacement 306 and slope 308 change at point C during the transition of the leading edge skin 214 from the first shape 228 to the second shape 232.

Point D is located aft of point C and may also be described as a location of constant curvature 226. As indicated above, the shape control mechanism 400 may include a lower link 412 extending from the main arm 402 to the point D support location 224. The lower link 412 may be used to support the leading edge skin 214 at point D to provide stiffness against aerodynamic loads. In some examples, Point D may be a location of zero-change-of-curvature or constant curvature 226 in the leading edge skin 214. Point D may also be described as a location of a reflex 300 in the curvature of the leading edge skin 214. Reflex of curvature may be describe a location where the leading edge skin 214 changes between a concave 302 shape to a convex 304 shape. A reflex 300 in the lower surface 166 may provide aerodynamic performance benefits for an airfoil 150 in the cruise configuration. For example, a reflex 300 in the lower surface 166 of a leading edge 200 may promote a nose-up pitching moment which may be beneficial with regard to the aerodynamic (e.g., pitch) stability of an aircraft. In the present disclosure, both the displacement 306 of point C and rotation of the slope 308 of point C may be enforced because of the inability of the leading edge skin 214 at point C to naturally bend into the desired shape when only the displacement 306 of point C is enforced. At points B and D, only displacement 306 may be enforced without a need to enforce the slope 308 at points B and D due to the natural tendency of the leading edge skin 214 to naturally bend into the desired shape at points B and D during the displacement 306 of points B and D. In some example, Point D may not require control of displacement or slope due to the natural tendency of the leading edge skin 214 to assume the desired shape at Point D, although Point D may require support against aerodynamic loads.

Points B, C, and/or D represent locations where respective portions of the flexible leading edge skin 214 at the respective support locations 224 have the same curvature in the first shape 228 as in the second shape 232. As indicated above, the shape control mechanism 400 may be attached to the flexible leading edge skin 214 at the support locations 224 where the flexible leading edge skin 214 has substantially the same curvature in the first shape 228 as in the second shape 232. Although the shape control mechanism 400 may be attached to the flexible leading edge skin 214 at any one of a variety of different locations, the attachment of the shape control mechanism 400 to the support locations 224 having substantially constant curvature may allow for locally increasing the load-carrying capability and, therefore, the bending stiffness of the leading edge skin 214 at the support locations 224. In this regard, a first portion of the flexible leading edge skin 214 at a first support location 224 (e.g., at Point B, C, and/or D) may have a higher bending stiffness relative to the bending stiffness of a second portion of the flexible leading edge skin 214 at a non-support location 224. In some examples, the leading edge skin 214 may be locally thickened at the support locations 224 due to a reduced need for flexibility at such locations. In contrast, intermediate locations along the arc length of the flexible leading edge skin 214 may undergo a greater change in curvature when the leading edge 200 transitions from the first shape 228 to the second shape 232 and, therefore, such intermediate locations may require increased flexibility.

Figure 5:
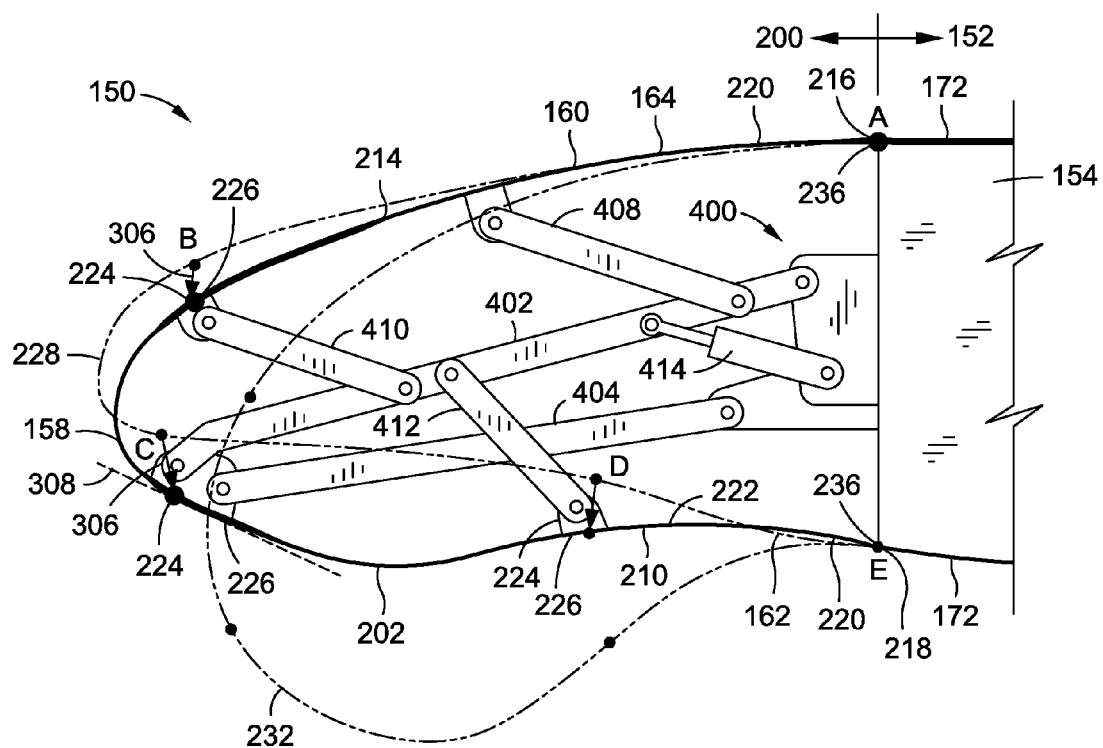
FIG. 5 is a sectional view of the leading edge in a one-quarter deployed position relative to the first shape of the leading edge shown in FIG. 4.

FIGS. 5-8 illustrate the progression in the shape change of the flexible leading edge skin 214 during the transition from the first shape 228 to the second shape 232. FIG. 5 shows the flexible leading edge skin 214 in a one-quarter deployed position relative to the first shape 228. The attachment of the main arm 402 and the rotation arm 404 to the support location 224 at point C enforces the change in displacement 306 and slope 308 of the leading edge skin 214 at point C. Attachment of the upper link 410 to point B enforces only a change in displacement 306 at point B with no enforcement of the slope at point B. Likewise, attachment of the lower link 412 to point D enforces only a change in displacement 306 at point D with no enforcement of the slope at point D. Any number of additional links may be included with the shape control mechanism 400 to control displacement and/or the slope of any number of different locations on the flexible leading edge skin 214. For example, FIGS. 5-8 illustrate a skin-stiffening link 408 extending from the main arm 402 to the upper portion of the leading edge skin 214 may be loaded in tension to counteract negative aerodynamic pressure that may tend to lift the flexible leading edge skin 214 along the upper portion when the leading edge 200 is in the first shape 228 (e.g., in the cruise profile).

Figure 6:
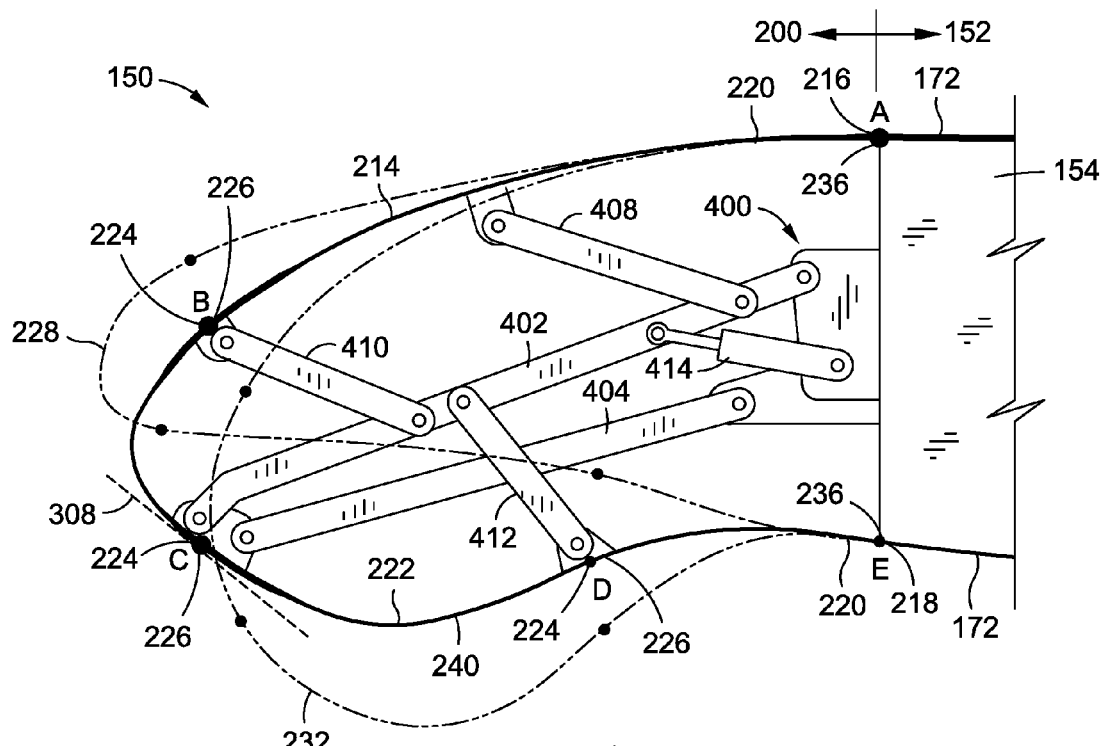
FIG. 6 is a sectional view of the leading edge in a one-half deployed position relative to the first shape of the leading edge.
Figure 7:
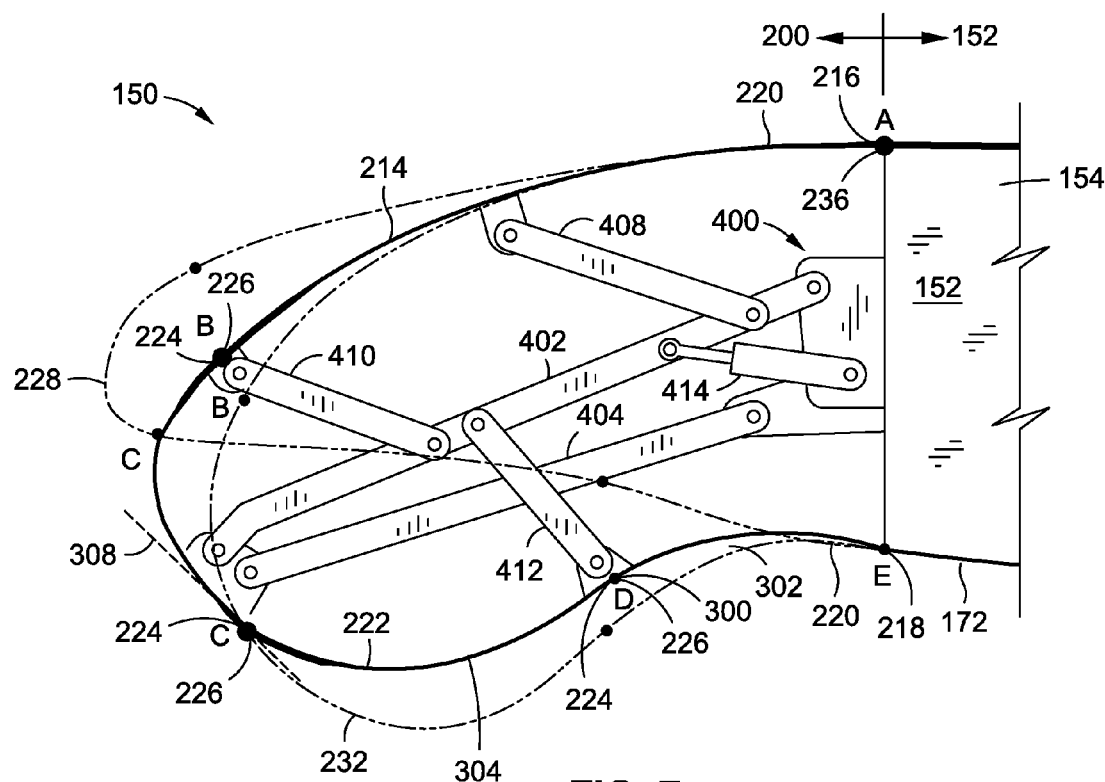
FIG. 7 is a sectional view of the leading edge in a three-quarters deployed position relative to the first shape of the leading edge.
Figure 8:
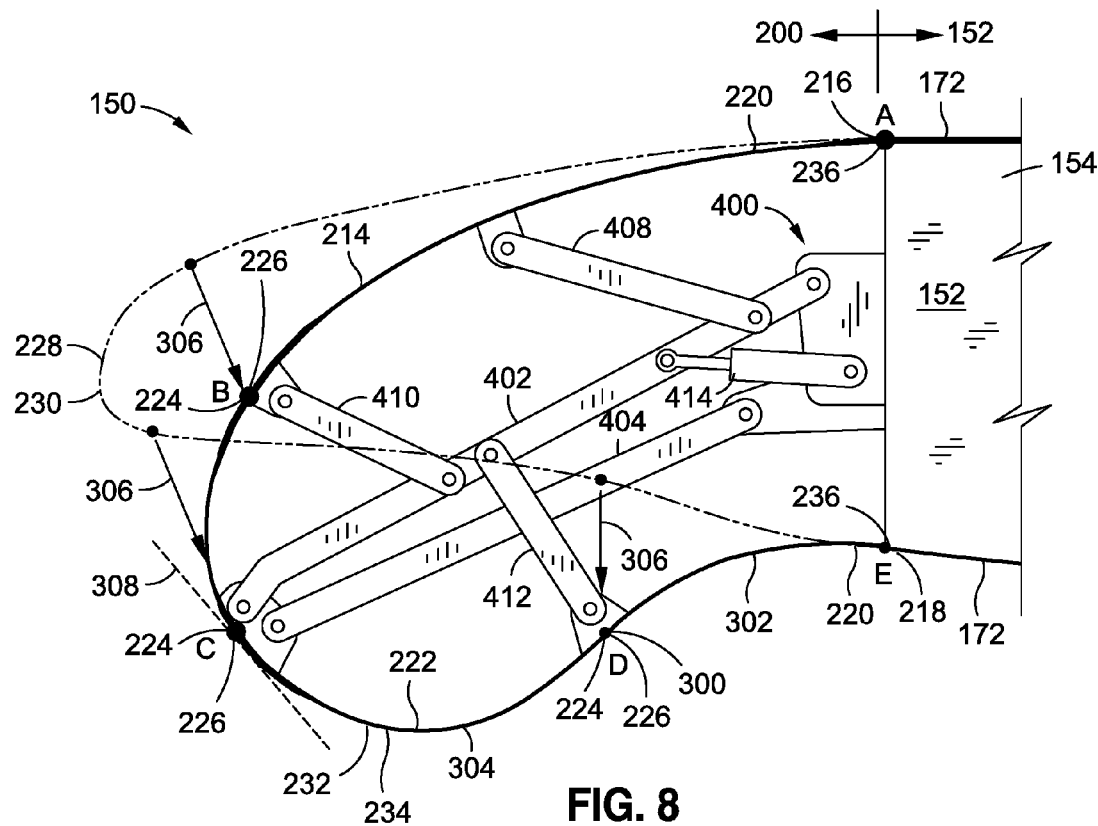
FIG. 8 is a sectional view of the leading edge in a fully deployed in the second shape.

FIG. 6 shows the leading edge 200 in a one-half deployed position relative to the first shape 228 and illustrates the changing slope 308 angle at point C and the displacement 306 of point C. FIG. 7 shows the leading edge 200 in a three-quarters deployed position relative to the first shape 228 and the further change in the slope 308 angle at point C. FIG. 8 shows the leading edge 200 in a fully deployed position which may be described as the second shape 232. The lower link 412 extending from the main arm 402 to the support location 224 at point D may be configured to counteract positive aerodynamic pressure against the lower surface 166 of the leading edge 200. In this regard, one or more of the links extending from the main arm 402 links may be configured to be loaded in compression as well as in tension. Other links of the shape control mechanism 400 may be configured to be loaded only in tension, and may not be configured to be loaded in compression, which may allow for a reduction in the structural size and/or structural mass of such tension links due to a decrease in the compression buckling capability of such links.

Figure 9:
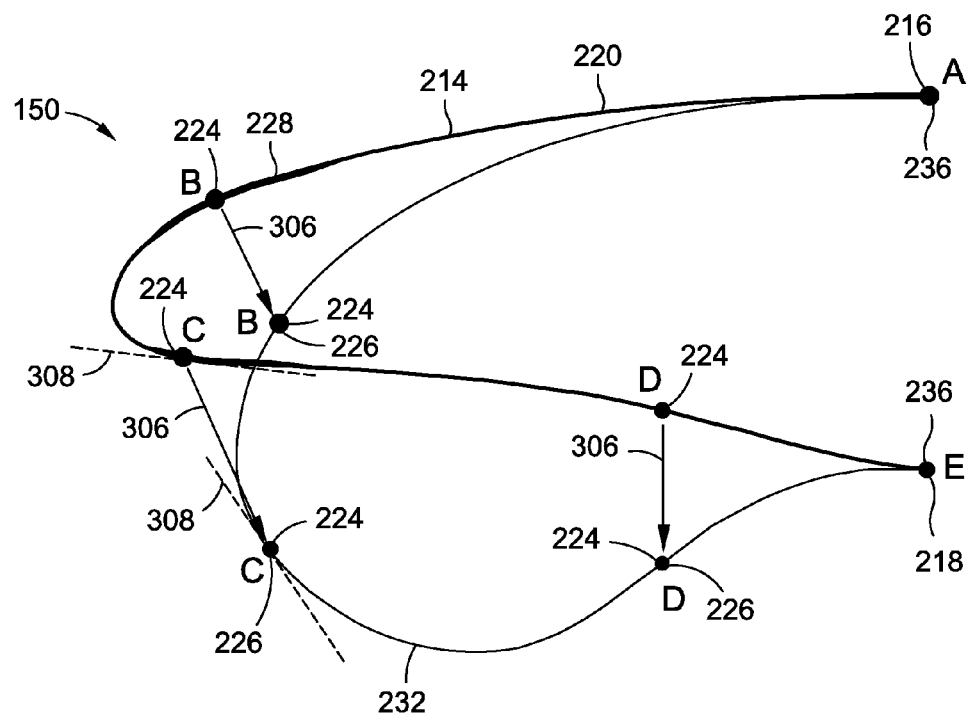
FIG. 9 is a diagrammatic view of the change in curvature at different locations along the arc length of the flexible leading skin when morphed from the first shape into the second shape.

FIG. 9 is a diagrammatic view of an embodiment of a flexible leading edge skin 214 in the first shape 228 and the transition to the second shape 232 to illustrate the change in curvature at different locations along the arc length during the transition. In the example shown, the flexible leading edge skin 214 may have zero bending stress in the first shape 228, ignoring any bending stress in the leading edge skin 214 from aerodynamic loads. In FIG. 9, the leading edge skin 214 is transitioned into the second shape 232 resulting in bending stress at all locations where the curvature of the leading edge skin 214 in the second shape 232 is different than the curvature of the leading edge skin 214 in the first shape 228. Points B, C, and D may undergo enforced displacement 306. Point C may undergo enforced change in slope 308 during the transition. The magnitude of the bending stress may be proportional to the magnitude of the change in curvature of the flexible leading edge skin 214. In the present disclosure, the term "delta curvature" may be used to refer to the change in curvature resulting from enforcement of the displacements 306 of the leading edge skin 214 during the transition from the first shape 228 to the second shape 232. The term "positive delta curvature" may be described as the delta curvature that results in tension stress in the inner surface of the flexible leading edge skin 214, and compression stress in the outer surface 220 of the flexible leading edge skin 214. The term "negative delta curvature" may be described as the delta curvature that results in compression stress in the inner surface of the flexible leading edge skin 214, and tension stress in the outer surface 220 of the flexible leading edge skin 214.

In FIG. 9, the delta curvature is negative along the section of the leading edge skin 214 from point A to point B. Point B is a support location 224 and may have a delta curvature of zero, meaning that point B is a location of zero change in curvature of the leading edge skin 214 when transitioning from the first shape 228 to the second shape 232. At point B, the delta curvature changes from negative to positive. From point B to point C, the delta curvature may be positive as a result of the relatively small radius of the leading edge 200 in the first shape 228 changing into a relatively large radius in the second shape 232. Point C may be another support location 224 and may have a delta curvature of zero. At point C, the delta curvature changes from positive back to negative. From point C to point D, the delta curvature may be negative. Point D may be another support location 224 and may have a delta curvature of zero. At point D, the delta curvature changes from negative back to positive. From point D to point E, the delta curvature may be positive.

As indicated above, the shape control mechanism 400 may be attached to the flexible leading edge skin 214 at the support locations 224 due to the substantially constant curvature of the leading edge skin 214 at the support locations 224. In this regard, the support locations 224 may be less flexible than other locations of the flexible leading edge skin 214 and therefore may accommodate a local increase in the structural mass and/or stiffness of the leading edge skin 214 to react the loads imposed by the arms and links on the leading edge skin 214 without causing faceting of the leading edge skin 214 due to the arm and/or links preventing bending of the leading edge skin 214. By supporting the leading edge skin 214 at locations of constant curvature 226, any local increase in bending stiffness of the leading edge skin 214 at the support locations may be inconsequential because there is zero change in curvature at such locations. If the leading edge skin 214 were supported at a location where there was substantial change in curvature, the support may prevent a change in curvature in the leading edge skin, which may result in a local facet or flat spot (or flatter spot) in the leading edge skin. Such faceting of the leading edge skin may have an undesirable effect of the aerodynamics of the airfoil.

Figure 10:
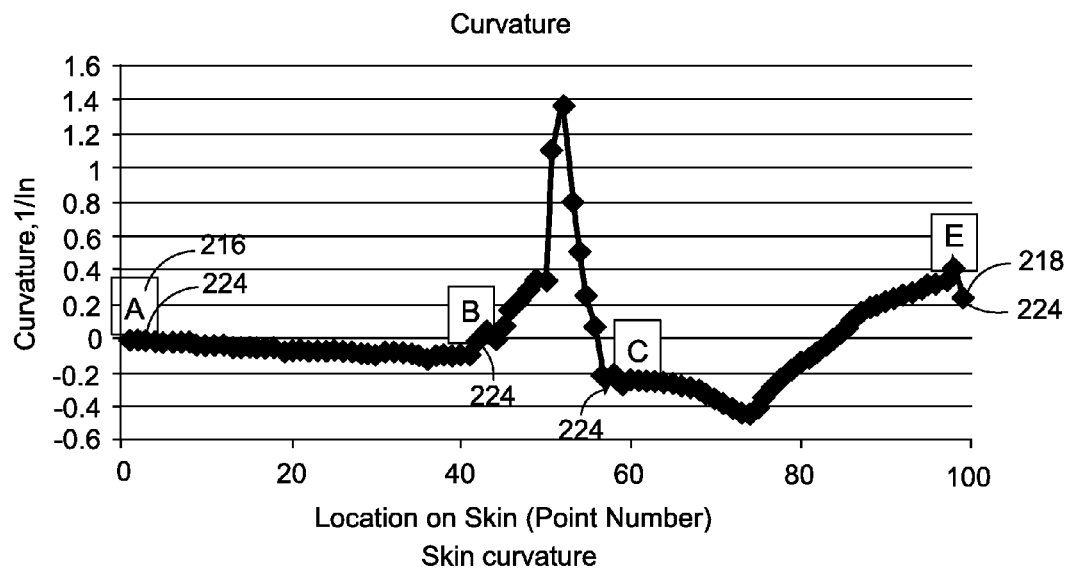
FIG. 10 is a graph plotting the curvature versus arc length of a non-limiting example of a flexible leading edge skin having a zero-stress first shape morphed into the second shape.

FIG. 10 is a graph plotting change in curvature (i.e., delta curvature) versus location along the arc length of the flexible leading edge skin 214 (FIG. 9) morphed from a zero-stress first shape 228 (FIG. 9) into the second shape 232 (FIG. 9). The left-hand side of the plot of FIG. 10 corresponds to the first end 216 of the leading edge skin 214. The right-hand side of the plot corresponds to the second end 218 of the leading edge skin 214. Points B and C on the plot illustrate the locations of zero change in curvature of the leading edge skin 214 and may correspond to support locations 224. Point D is not shown in the plot.

Figure 11:
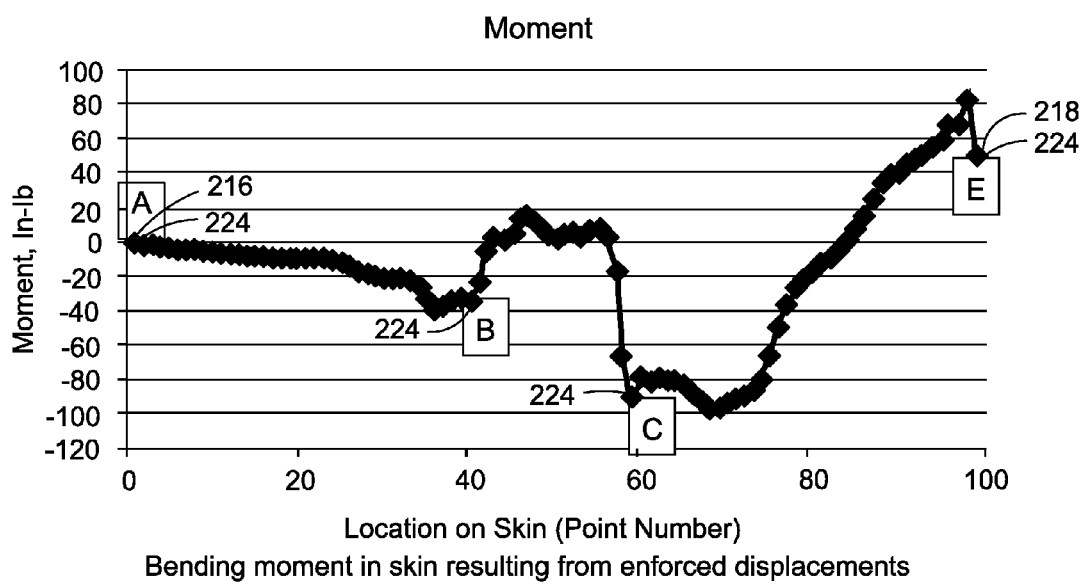
FIG. 11 is a graph plotting bending moment versus arc length of the example of the flexible leading edge skin when morphed from a zero-stress first shape into the second shape.

FIG. 11 is a graph plotting bending moment versus location along the arc length of the flexible leading edge skin 214 (FIG. 9) when morphed from the zero-stress first shape 228 (FIG. 9) into the second shape 232 (FIG. 9). The bending moment at different locations along the arc length of the flexible leading edge skin 214 may be determined based upon the linear relationship of bending moment to curvature. The bending moment is the result of enforced displacement and/or rotation (i.e., slope change) of the leading edge skin 214 support at the support locations 224 at points B and C.

Figure 12:
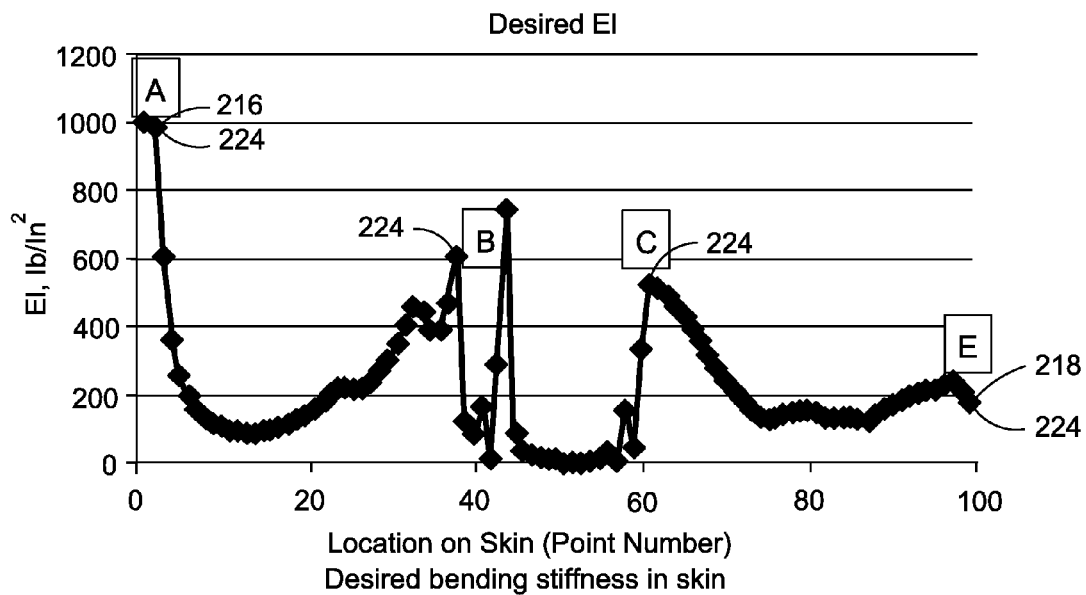
FIG. 12 is a graph plotting desired bending stiffness versus arc length for a flexible leading edge skin subjected to the bending moment profile shown in FIG. 11.

FIG. 12 is a graph plotting desired bending stiffness versus location along the arc length of the flexible leading edge skin 214 (FIG. 9) subjected to the bending moment profile shown in FIG. 11. The desired bending stiffness of the flexible leading edge skin 214 may be calculated at any location along the arc length of the skin based on the bending moment and the curvature of the skin at that location. Points B and C on the plot illustrate the locations of the leading edge skin 214 having relatively high stiffness which lend such points as support locations 224 (FIG. 9), as indicated above.

Figure 13:
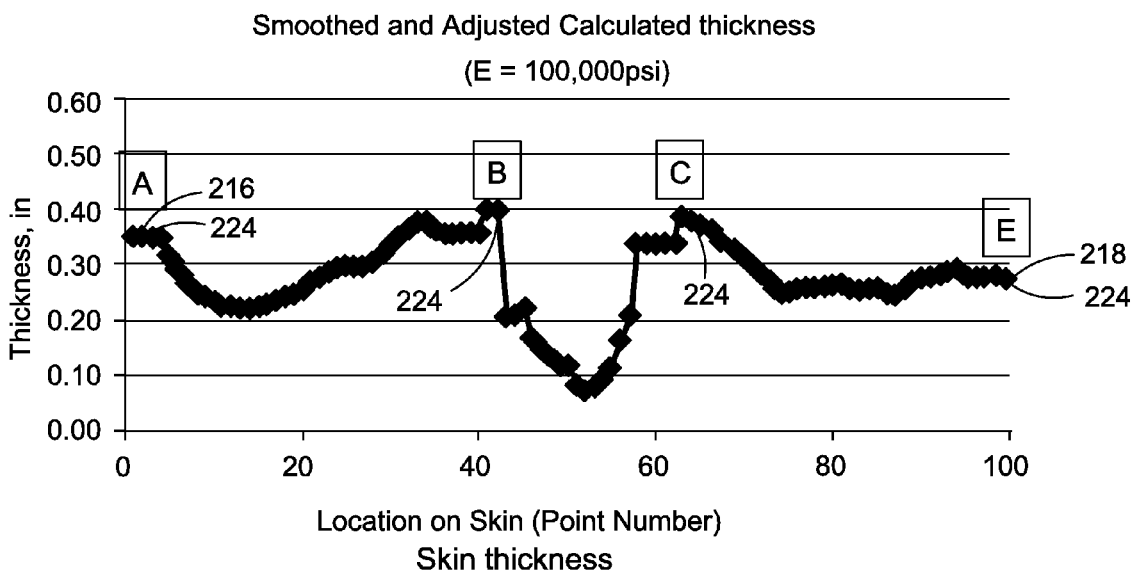
FIG. 13 is a graph plotting desired skin thickness versus arc length for an isotropic (e.g., metallic) leading edge skin having the bending stiffness profile shown in FIG. 12.

FIG. 13 is a graph plotting desired skin thickness 238 (FIG. 4) versus location along the arc length of an isotropic leading edge skin 214 (FIG. 9) having the desired bending stiffness profile shown in FIG. 12. For an isotropic leading edge skin 214, the bending stiffness is a function of the modulus of elasticity (E) of the skin and the moment of inertia (I) of the plate. Moment of inertia (I) is a function of skin thickness. For an isotropic material having a uniform modulus of elasticity (E), the cross-sectional skin thickness 238 of the flexible leading edge skin 214 may be varied along the arc length to provide the desired bending stiffness profile such that the desired curvature profile may be formed in the flexible leading edge skin 214.

In some examples, the flexible leading edge skin 214 may be formed of an isotropic material which has the same modulus of elasticity in every direction within the material. In some embodiments, the isotropic material may be a metallic material such as aluminum, titanium, or other metallic materials or combinations thereof. However, the isotropic material may be a non-metallic material such as a ceramic material or a polymeric material. In some examples, the flexible leading edge skin 214 may be formed as a homogenous article composed of the same material along the arc length. In other examples, the flexible leading edge skin 214 may be formed as a non-homogenous article having different materials at different locations along the arc length. In this regard, certain portions along the arc length of the leading edge skin 214 may be formed of a first material and other portions of the arc length may be formed of a second material that may be different than the first material. For example, during morphing of the leading edge 200 between the first shape 228 and the second shape 232, sections of the arc length that undergo relatively small changes in curvature such as the section between points A and B (FIG. 9) may be formed of a material having a relatively high modulus of elasticity (e.g., titanium) which may provide higher resistance to deflections on the upper surface 164 due to aerodynamic loads, as mentioned above. Sections of the arc length that undergo relatively large changes in curvature such as between points B and E (FIG. 9) may be formed of a relatively low-modulus material (e.g., aluminum).

Although the leading edge skin 214 is described in the present disclosure as being provided (e.g., manufactured) in a zero-stress state in the first shape 228 (e.g., a cruise profile) such that the leading edge skin 214 develops bending stress when morphed into the second shape 232, in another embodiment, the leading edge skin 214 may be provided in a zero-stress state in the second shape 232 (e.g., a drooped profile) such that the leading edge skin 214 develops bending stress when morphed into the first shape 228. In still other embodiments, the leading edge skin 214 may be provided in a zero-stress state in an intermediate shape (not shown), and the leading edge skin 214 may develop bending stress when morphed into the first shape 228 and the second shape 232.

In any of the embodiments disclosed herein, the leading edge skin 214 may be pre-manufactured with a slightly bowed shape in portions of the leading edge skin 214 to compensate for curvature occurring in such portions due to bending stresses generated during morphing of the leading edge skin 214. In this manner, the final shape (e.g., the morphed shape) of the leading edge skin 214 may have the desired aerodynamic profile. In some examples, the leading edge skin 214 may be provided with a slightly bowed shape (not shown) along portions of the leading edge skin 214 that tend to deflect under aerodynamic load. For example, the upper portion of the leading edge skin 214 between points A and B may be pre-manufactured with a slight indentation or bow when viewed in cross-section. The slightly bowed or indented shape may be locally formed in the leading edge skin 214 at a depth such that aerodynamically-induced deflections may pull upwardly on the leading edge skin 214 and cause the leading edge skin 214 to assume a nominal or desired aerodynamic profile for cruise flight.

In some examples, the flexible leading edge skin 214 may be a composite skin formed of composite material 310 (FIG. 14) or other anisotropic material having a non-uniform modulus of elasticity in different directions. In contrast to an isotropic (e.g., metallic) leading edge skin 214 wherein the bending stiffness may be tailored by varying the geometry (e.g., the cross-sectional thickness of the skin) along the arc length of the skin, the bending stiffness of a composite (e.g., anisotropic) leading edge skin 214 may be varied by tailoring the properties of the composite material 310 that makes up the composite skin. In this regard, the skin thickness 238 of the composite leading edge skin 214 may be maintained substantially constant along the arc length of the skin, and the bending stiffness may be varied by varying the mechanical properties of the composite material 310.

A composite skin 214 may be formed as a composite laminate 312 (FIG. 14) made up of a stack of composite plies 314 (FIG. 14) of fiber-reinforced polymer matrix material. Each composite ply 314 in the composite laminate 312 may include reinforcing fibers that serve as the primary load-carrying constituent of the composite laminate 312. In some examples, the composite material 310 may be formed as unidirectional tape containing reinforcing fibers held in position by a matrix constituent (e.g., matrix material). The matrix constituent may redistribute or transfer loads between adjacent fibers. The fibers may be oriented generally parallel to one another in each composite ply 314 of the composite laminate 312. The composite laminate 312 may be configured such that the reinforcing fibers in one ply are oriented in the same direction or in a different direction than the reinforcing fibers in one or more of the other composite plies 314 in the composite laminate 312. The relative orientations of the fibers in the different composite plies 314 (i.e., the ply stacking sequence 316) may be selected to provide the desired strength and stiffness characteristics of the composite laminate 312.

The reinforcing fibers may be formed of metal, glass, ceramic, carbon or graphite, Kevlar™, or any other type of fiber material, and may be embedded within a thermoplastic or thermosetting polymer matrix material such as an epoxy matrix. Each ply in the composite laminate 312 (FIG. 14) may be formed of the same material system. However, the composite laminate 312 may also be formed as a hybrid laminate containing composite plies 314 formed of different materials to achieve a desired design objective. For example, a hybrid composite laminate may primarily include composite plies 314 formed of unidirectional carbon fiber tape for load-carrying purposes. The hybrid composite laminate may also include one or more outer plies formed of woven fiberglass cloth to provide impact resistance to the composite laminate. In a composite laminate 312 having multiple composite plies 314 with fiber angles oriented according to a desired ply stacking sequence 316 (FIG. 14), the bending stiffness in one direction of the composite laminate 312 may be different than the bending stiffness in another direction of the composite laminate 312. For a flexible leading edge skin 214 formed as a composite laminate 312, the bending stiffness of the composite laminate 312 leading edge skin 214 may be tailored along the arc length direction by varying the fiber orientation of the fibers in a predetermined manner along the arc length direction, as described below.

Figure 14:
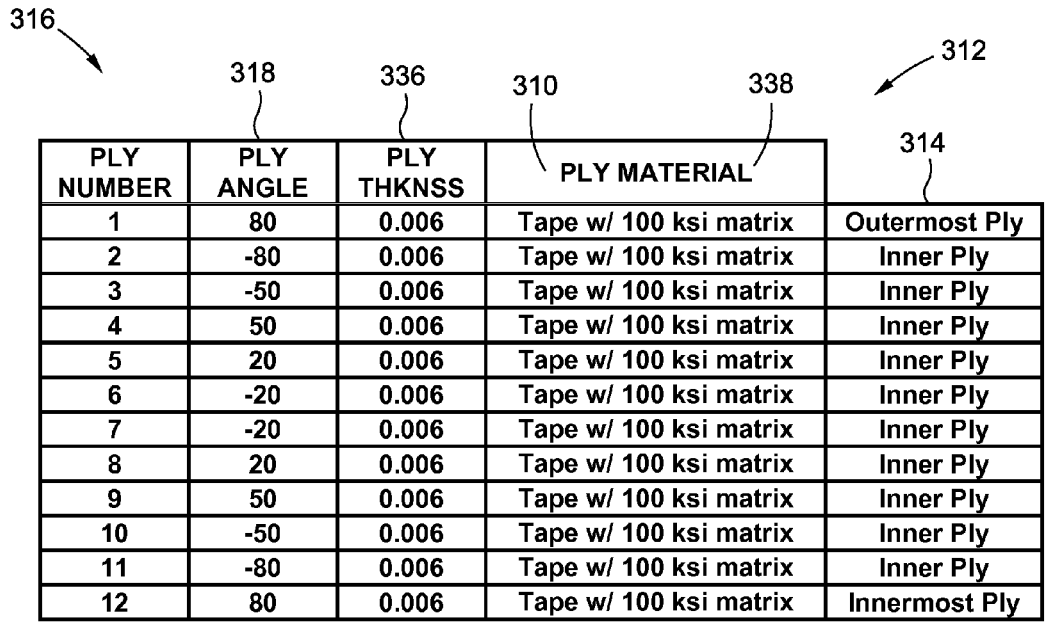
FIG. 14 is a table showing an example of a ply stacking sequence of a composite laminate having an outermost ply containing fibers oriented at a ply angle (i.e. a fiber angle) of greater than 60 degrees relative to the span-wise direction of the leading edge skin.

FIG. 14 is a table showing an example of a ply stacking sequence 316 of a 12-ply composite laminate 312 having an outermost ply containing fibers oriented at a ply angle 318 (i.e., a fiber angle) of greater than 60 degrees relative to the span-wise direction of the leading edge skin 214. In the example shown, the outermost ply has a ply angle 318 of approximately 80 degrees relative to the span-wise direction. In the embodiment shown, the inner plies are oriented at either 30 degrees or 60 degrees less than the ply angle 318 of the outermost ply. The ply stacking sequence 316 illustrated in FIG. 14 may be represented by the notation $[80/-80/-50/50/20/-20]_S$ wherein the subscript s indicates that the stacking sequence 316 is symmetrical about the mid-plane of the laminate. Any one of a variety of other ply stacking sequences (e.g., $[70/-70/-40/40/10/-10]_S$, $[65/-65/-35/35/5/-5]_S$, etc.) may be provided based on the above-noted relationship regarding the 30-degree or 60-degree difference in the ply angle 318 of the inner plies relative to the ply angle 318 of the outermost ply. However, the ply stacking sequence 316 of a composite laminate 312 for a leading edge skin 214 may be provided using any difference in the ply angle 318 of the inner plies relative to the ply angle 318 of the outermost ply. Furthermore, a ply stacking sequence 316 may be provided in a non-symmetrical and/or a non-balanced layup as an alternative to the stacking sequence examples disclosed herein.

Figure 15:
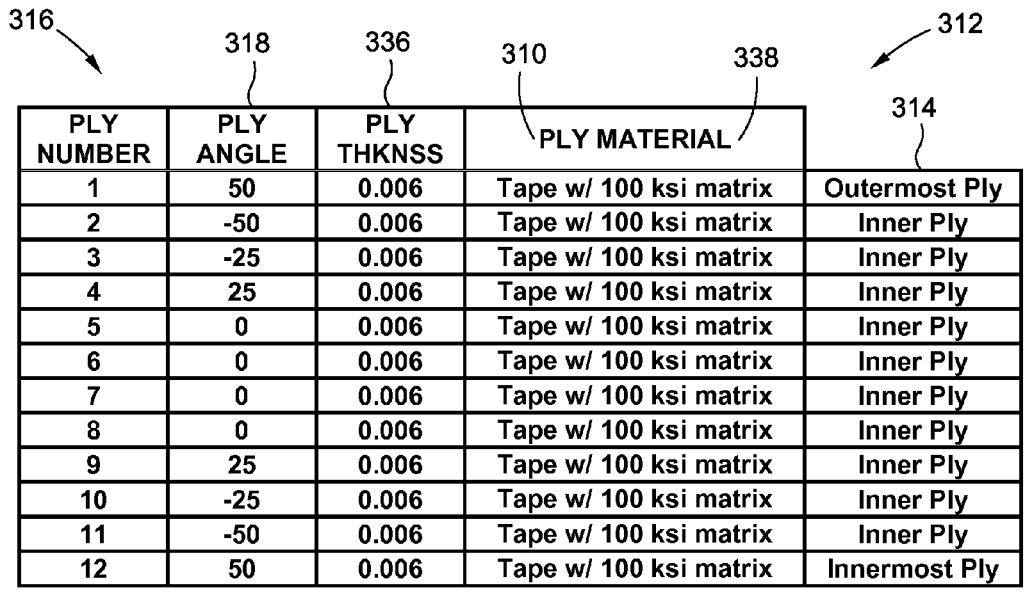
FIG. 15 is a table showing a further example of a ply stacking sequence of a composite laminate having an outermost ply containing fibers oriented at a ply angle equal to or less than 60 degrees relative to the span-wise direction of the leading edge skin.

FIG. 15 is a table showing a further example of a ply stacking sequence 316 of a 12-ply composite laminate 312 having an outermost ply containing fibers oriented at a ply angle 318 equal to or less than 60 degrees relative to the span-wise direction of the leading edge skin 214. The inner plies are oriented at either one-half of the ply angle 318 of the outermost ply, or at a ply angle of 0 degrees (i.e., parallel to the spanwise direction 320—FIG. 2). The ply stacking sequence 316 illustrated in FIG. 15 may be represented by the notation $[50/-50/-25/25/0/0]_S$. Any one of a variety of other ply stacking sequences may be provided based on the above-noted relationship between the ply angle 318 of the inner plies relative to the ply angle 318 of the outermost ply (e.g., $[60/-60/-30/30/0/0]_S$, $[30/-30/-15/15/0/0]_S$, $[4/-4/-2/2/0/0]_S$., etc.). As indicated above, the ply stacking sequence 316 may be provided using any relationship between the ply angle 318 of the inner plies and the ply angle 318 of the outermost ply.

Figures 16, 17:
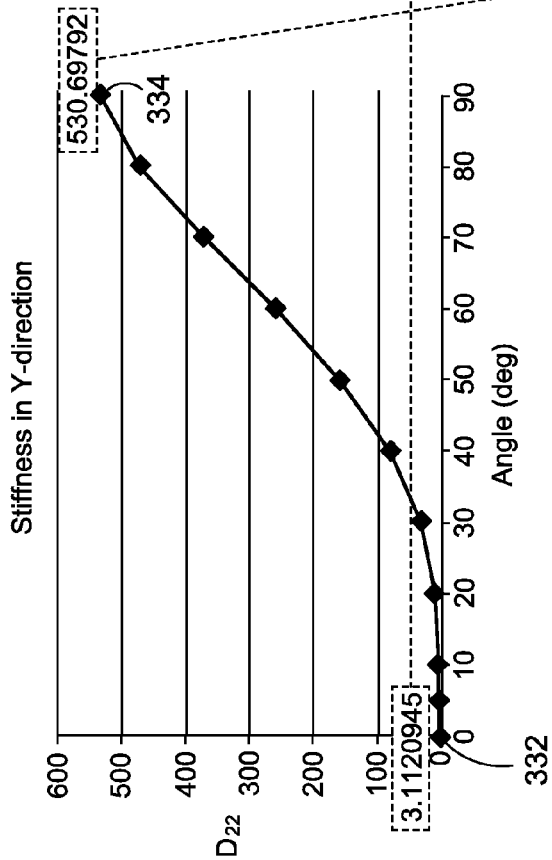
FIG. 16 shows a stiffness matrix for characterizing the stiffness of a composite laminate and illustrating the different values for extensional stiffness (A), bending stiffness (B), and coupling stiffness (D) for each of two different composite laminates.
FIG. 17 is a graph showing the variation in bending stiffness in the arc-length direction as a function of fiber angle of the outermost ply of a composite laminate.

FIG. 16 shows a stiffness matrix 330 that may be used for characterizing the stiffness properties of a composite laminate. The stiffness matrix 330 may be described as an ABD stiffness matrix and includes coefficients A, B, and D, the calculated values of which are a function of the ply stacking sequence 316 (FIG. 14), the ply angle 318, the ply thickness 336, and the material properties (i.e., the ply material 338) of a composite laminate 312. The A coefficients of the ABD stiffness matrix represent the extensional stiffness (i.e., the stretching stiffness) of the laminate and may be described as the resistance of a laminate to in-plane extension and shearing under in-plane loading. The D coefficients represent the bending stiffness of the laminate and may be described as the resistance of a composite laminate to out-of-plane bending under out-of-plane loading. In one example, the $D_{22}$ coefficient may be used to approximate the out-of-plane bending stiffness of the composite laminate along the arc length direction of a leading edge skin. However, in the present disclosure, any one or more of the D coefficients may be used to approximate the out-of-plane bending stiffness of the composite laminate along the arc length direction of a leading edge skin 214. The B coefficients represent the coupling stiffness of the laminate and may be described as the coupling of the in-plane response of the laminate with the bending response of the laminate.

In FIG. 17, below the listing of the basic ABD stiffness matrix 330 are two sets of numerical values that have been calculated for the A, B, and D terms for two composite laminates. The two laminates represent opposite extremes of a ply stacking sequence for a composite laminate following the above-noted relationships between the ply angle 318 of the inner plies and the ply angle 318 of the outermost ply, as described above with regard to FIGS. 14-15. The first composite laminate (i.e., the 0-degree laminate 332) has a ply angle of 0 degrees for the outermost ply and a ply stacking sequence of $[0/0/0/0/0/0]_S$, and results in a $D_{22}$ term of approximately 3.1. The second composite laminate (i.e., the 90-degree laminate 334) has a ply angle of 90 degrees for the outermost ply and a ply stacking sequence of $[90/-90/-60/60/30/-30]_S$, and results in a $D_{22}$ term of approximately 530.7.

FIG. 17 is a graph showing the variation in the $D_{22}$ bending stiffness as a function of fiber angle of the outermost ply of a composite laminate. The y-direction in the graph corresponds to the arc length direction (i.e., the chordwise direction 322—FIG. 3) of the leading edge skin 214. The $D_{22}$ bending stiffness for the 0-degree ply angle on the graph corresponds to fibers in the outermost ply being oriented perpendicular to the arc length direction according to the above-noted ply stacking sequence for the 0-degree laminate 332. The $D_{22}$ bending stiffness for the 90-degree ply angle on the graph corresponds to fibers in the outermost ply being oriented parallel to the arc length direction according to the above-noted ply stacking sequence for the 90-degree laminate 334. As shown in FIG. 17, a 0-degree ply angle provides relatively low bending stiffness in the arc length direction. The bending stiffness of the composite laminate increases as the ply angle of the outermost ply approaches 90-degrees.

Figure 18:
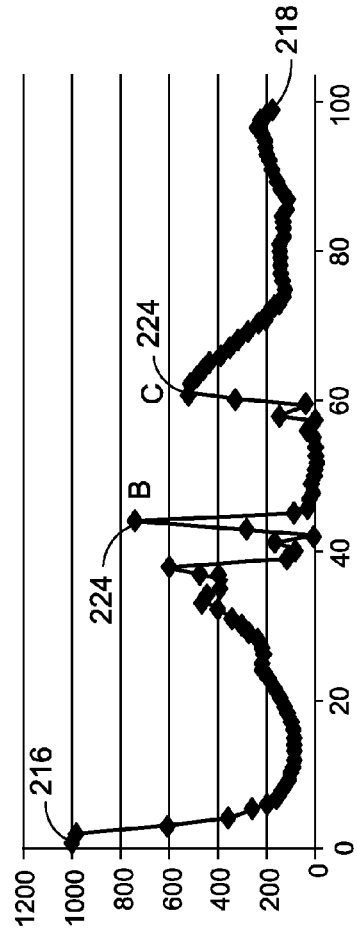
FIG. 18 is a graph of desired bending stiffness plotted as a function of arc length for a composite laminate leading edge skin subjected to the bending moment profile shown in FIG. 11.

FIG. 18 is a graph of desired bending stiffness 324 plotted as a function of arc length for a composite laminate leading edge skin 214 subjected to a bending moment profile (e.g., see FIG. 11). In the present disclosure, the bending stiffness of the composite laminate leading edge skin 214 may be tailored based on the ply angle of the outermost ply and inner plies to provide the desired bending stiffness 324 at each location along the arc length. Although FIGS. 16 and 17 illustrate the absolute value of the $D_{22}$ bending stiffness, it is not necessary for the $D_{22}$ term to be equivalent to the desired bending stiffness 324 at each location along the arc length to achieve the desired bending characteristics in the leading edge skin 214. In some examples, the bending stiffness of the leading edge skin 214 may be a scaled value of the $D_{22}$ term.

Figure 19:
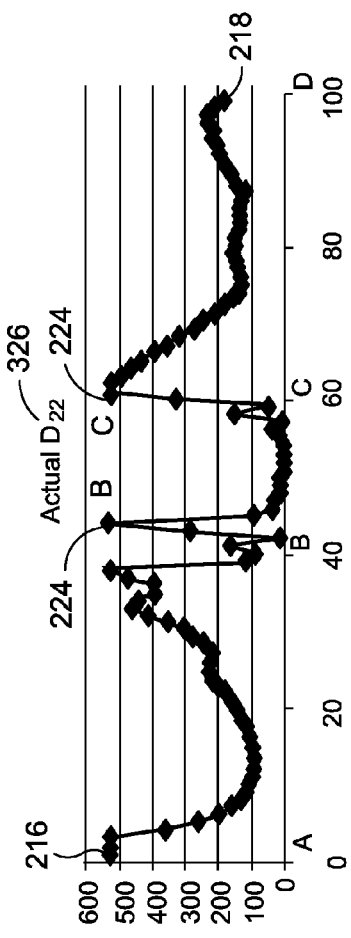
FIG. 19 is a graph plotting actual bending stiffness of a composite leading edge skin that substantially duplicates the desired bending stiffness profile shown in FIG. 18.

FIG. 19 is a plot showing actual bending stiffness 326 of the leading edge skin 214 as a scaled value of the desired bending stiffness 324 (EI) shown in the plot of FIG. 18. For example, in FIG. 18, the first end 216 of the leading edge skin 214 has a $D_{22}$ bending stiffness value of approximately 1000. In FIG. 19, the first end 216 has a scaled value of approximately 500. In this regard, the composite laminate may be configured to have an actual bending stiffness 326 that may be different than the bending stiffness shown in FIG. 19, as long as the scaling factor is the same at all locations along the arc length. However, in some examples, it may be desirable to limit the scaling of the $D_{22}$ value to an extent that the leading edge skin 214 maintains the capability to resist out-of-plane deflections caused by aerodynamic loading. In addition, it may also be desirable to scale the $D_{22}$ value by an amount that avoids an overly-stiff and therefore excessively-heavy leading edge skin 214 that may undesirably add to the weight of an aircraft 100.

Figure 20:
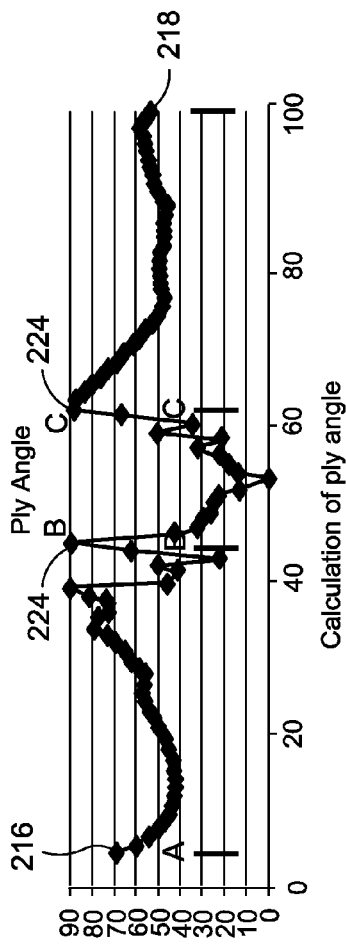
FIG. 20 is a graph plotting the fiber angle of a composite ply in the composite leading edge skin having a bending stiffness that is substantially similar to the actual bending stiffness profile shown in FIG. 19.

FIG. 20 is a plot showing the variation in the ply angle 318 (i.e., fiber angle) of the outermost ply of a composite laminate 312. The variation in the ply angle shown in FIG. 20 may result in the composite laminate 312 having the actual bending stiffness 326 profile shown in FIG. 19. By varying the ply angle 318 of the outermost ply in accordance with FIG. 20 and correspondingly varying the ply angles 318 of the inner plies based on a predetermined ply stacking sequence (e.g., the relationship between the ply angles of the inner plies and the outermost plies), the relative values of $D_{22}$ (or other D coefficient(s)) can be achieved at each point along the arc length such that the leading edge skin 214 has the desired bending stiffness 324 at all locations along the arc length. For example, FIG. 20 illustrates a ply angle of 90° at points B and C which correspond to locations of relatively high bending stiffness in the leading edge skin 214 for the support locations at points B and C in FIG. 19.

Figure 21:
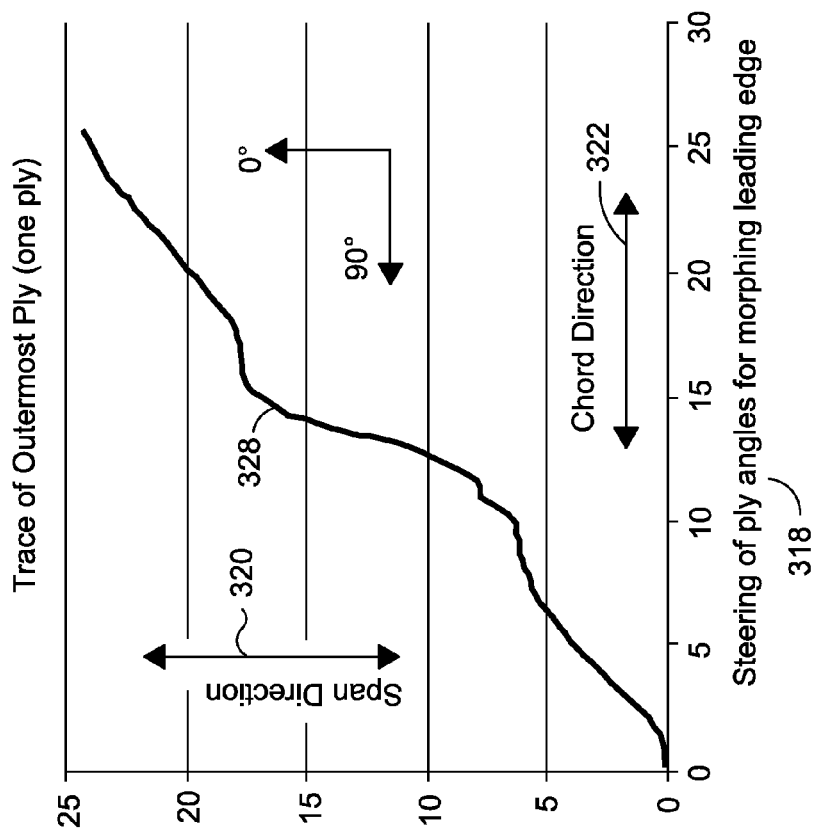
FIG. 21 is a trace of a fiber of an outermost composite ply of a composite leading edge skin providing a desired bending stiffness profile of the leading edge skin.

FIG. 21 shows a trace 328 of one of the fibers of an outermost ply. The trace or ply angle variation in the fiber may result in a composite laminate 312 having the actual desired bending stiffness profile of the leading edge skin 214 of FIG. 19. During lay-up of the composite laminate 312, the ply angle 318 of a composite ply 314 may be steered in the x-direction and y-direction (i.e., in the spanwise direction 320 and chordwise direction 322) such that the desired ply angle 318 is provided at each location along the arc length. For portions of the arc length where a relatively low bending stiffness is desired along the chordwise direction such as in the portion between Points B and C (see FIG. 21), the ply angle 318 of the outermost ply may be oriented close to 0 degrees relative to the span-wise direction of the leading edge skin 214 as indicated above. The inner plies may also be oriented close to 0 degrees according to the above-noted relationship between the ply angle 318 of the inner plies relative to the ply angle 318 of the outermost ply. However, due to difficulties in laying up fibers at a 0-degree angle as a result of bunching and/or overlapping of the fibers, the fibers may be laid up at a slightly shallower ply angle 318 of 10 degrees or less along such portions of the leading edge skin 214. In some examples, an automated tape laying machine may lay up unidirectional tape with the variable ply angle 318 from a first end 216 of the arc length to a second end 218 (i.e., an opposite end) of the arc length. In other examples, the ply angle may be varied during manual layup of composite plies.

Figure 22:
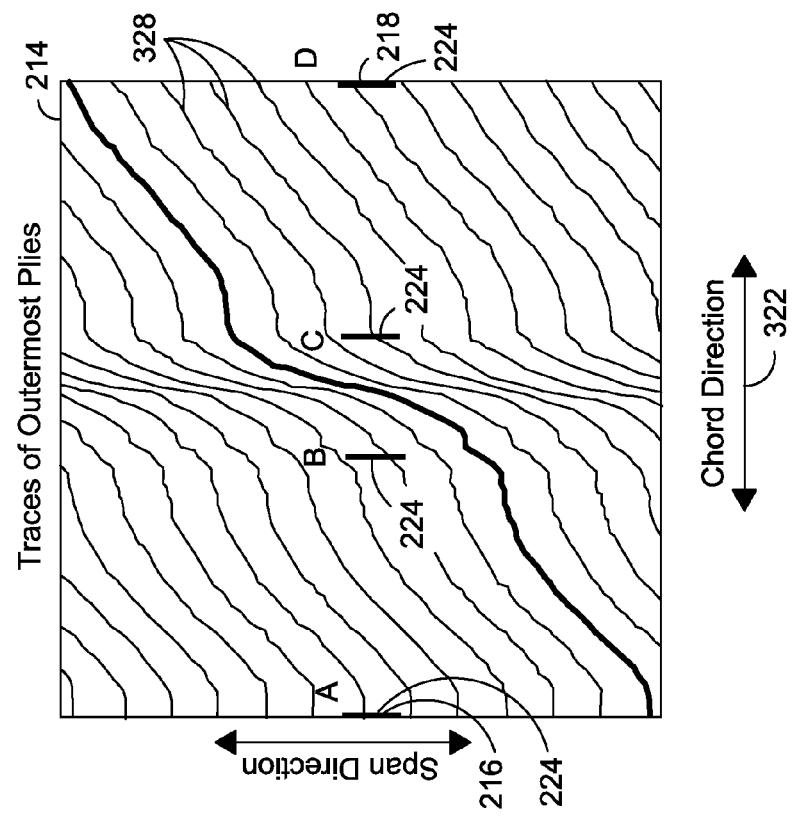
FIG. 22 is a schematic diagram of the traces of the angular orientation of a plurality of fibers included in the outermost ply of a composite leading edge skin.

FIG. 22 shows the traces of a plurality of fibers of the outermost ply of the composite leading edge skin 214 and showing the locations of points A, B, C, and D. Similar plots tracing the ply angles 318 for the fibers of the inner plies may also be generated in accordance with a predetermined ply stacking scheme (e.g., FIG. 14 or 15). Points A and D in FIG. 22 correspond to the first end 216 and the second end 218 of the arc length. The ply angle 318 (i.e., fiber angle) at the first end 216 may be substantially parallel to the chordwise direction which results in a relatively high bending stiffness at such locations. Points B and C are support locations 224 where the shape control mechanism 400 (FIG. 4) attaches to the leading edge skin 214. Point B and C have substantially constant curvature (i.e., zero change in curvature) as the leading edge 200 morphs between the first shape 228 and the second shape 232, as indicated above. The ply angle 318 of the fibers is such that the bending stiffness of the skin is relatively high at points A, B, and C. For sections of the leading edge skin 214 located between the support locations 224, the ply angle 318 of fibers is such that the bending stiffness the skin is relatively low which provides the leading edge skin 214 with greater flexibility. As indicated above, the ply angle 318 of fibers in some portion of the arc length may be oriented at an angle of slightly greater than 0 degrees (e.g., 10 degrees) to simplify the layup process by avoiding bunching or overlapping of fibers, as indicated above.

Figure 23:
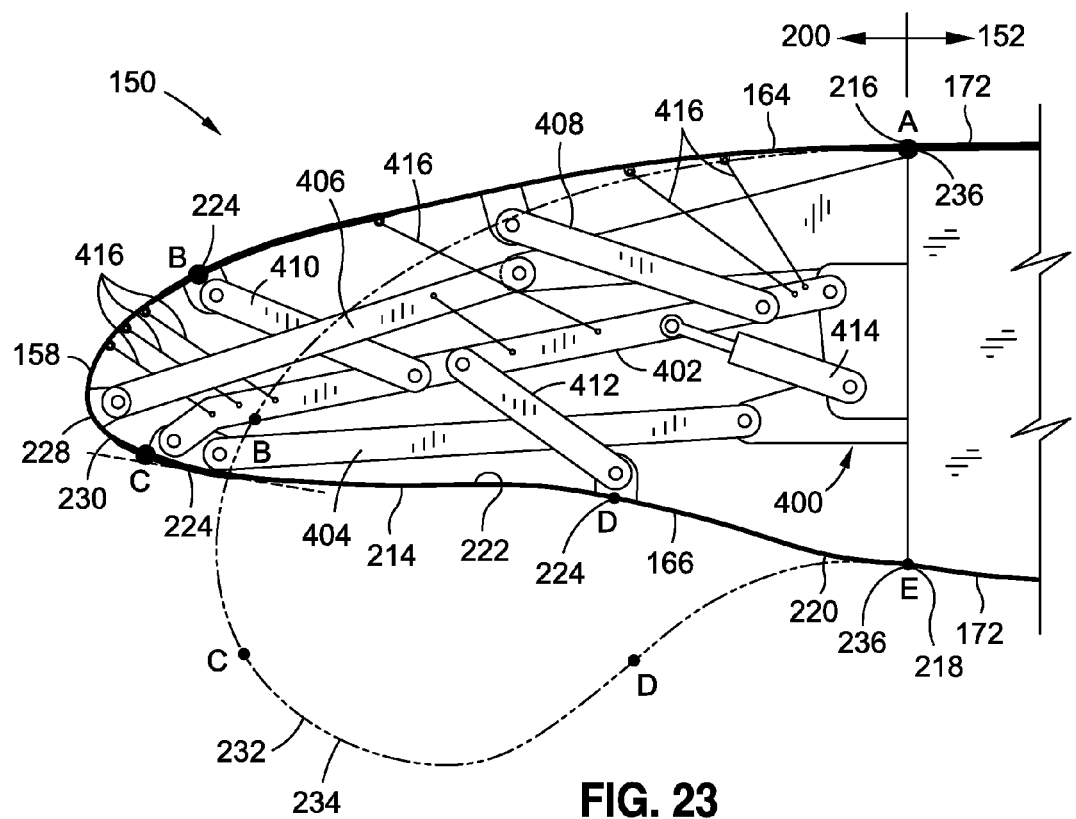
FIG. 23 is a sectional view of an embodiment of a shape control mechanism supporting the leading edge in a first shape and including additional air load links and/or nose links for stabilizing the flexible leading edge skin against aerodynamic loads.
Figure 24:
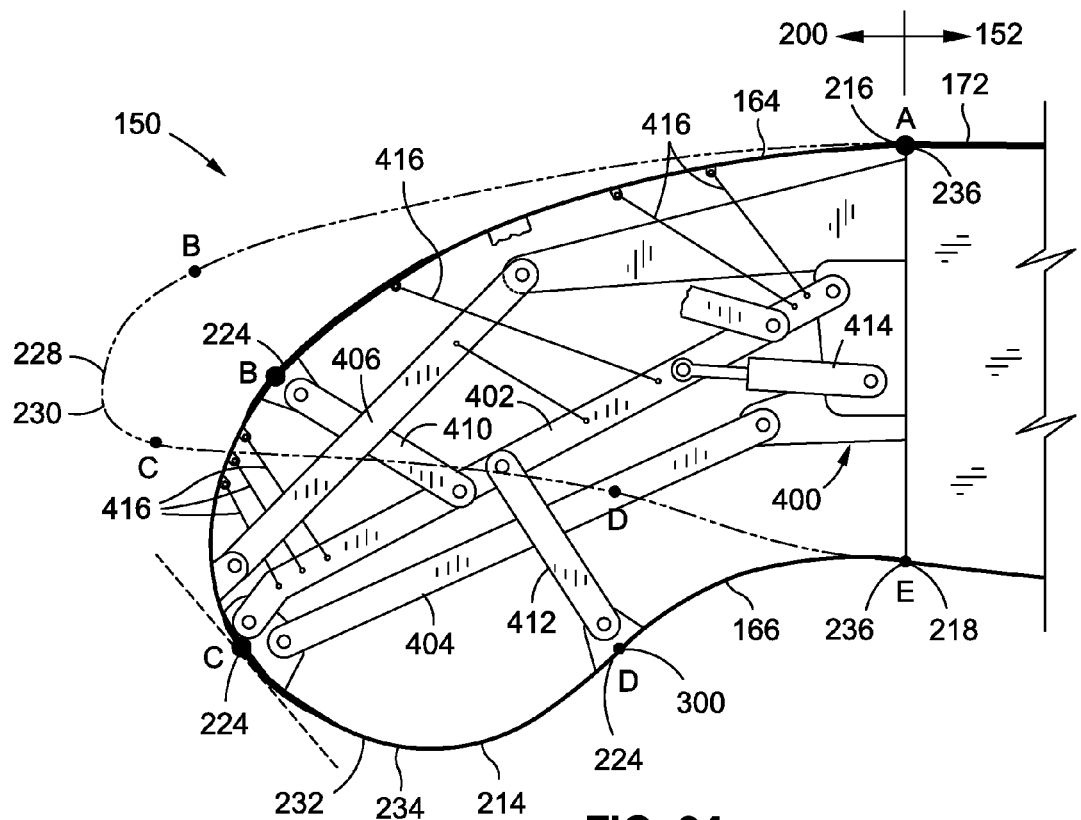
FIG. 24 is a sectional view of the shape control mechanism of FIG. 23 showing the leading edge in a second shape.

FIGS. 23-24 show an embodiment of the leading edge 200 in the first shape 228 and the second shape 232 with the shape control mechanism 400 having additional arms and/or links for supporting the leading edge skin 214. In some examples, the shape control mechanism 400 may include a skin-stiffening link 408 extending upwardly from the main arm 402 and attached to the inner side 222 of the leading edge skin 214 along the upper surface 164. The skin-stiffening link 408 may stabilize the flexible leading edge skin 214 against negative aerodynamic pressure acting on the upper surface 164 and which may tend to deflect the leading edge skin 214 upwardly. Additional upper links 410 that may be included and may be positioned at any location to stabilize the leading edge skin 214 against aerodynamically-induced deflections. In some examples, the shape control mechanism 400 may include an optional nose arm 406 extending from the airfoil main portion 152 toward the nose 158 of the leading edge skin 214 to react against positive aerodynamic pressure bearing on the forward-most portion of the leading edge skin 214. One or more nose links 416 may extend upwardly from the main arm 402 to the leading edge skin 214 to react negative aerodynamic pressure on section of the leading edge skin 214 above the forward-most portion of the nose 158. As indicated earlier, the shape control mechanism 400 may further include one or more lower links 412 that may extend downwardly from the main arm 402 to the leading edge skin 214 along the lower surface 166.

Figure 25:
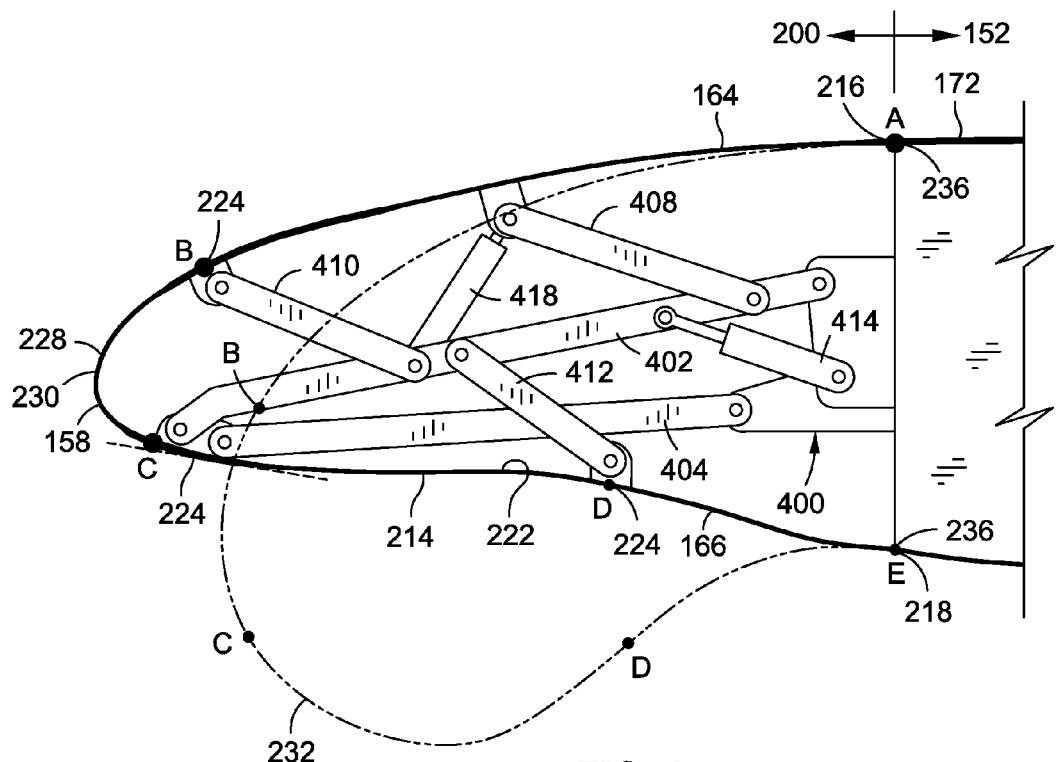
FIG. 25 is a sectional view of an embodiment of a shape control mechanism supporting the leading edge in a first shape and illustrating a locking mechanism for locking the flexible leading edge skin at any one of a variety of deployment positions.
Figure 26:
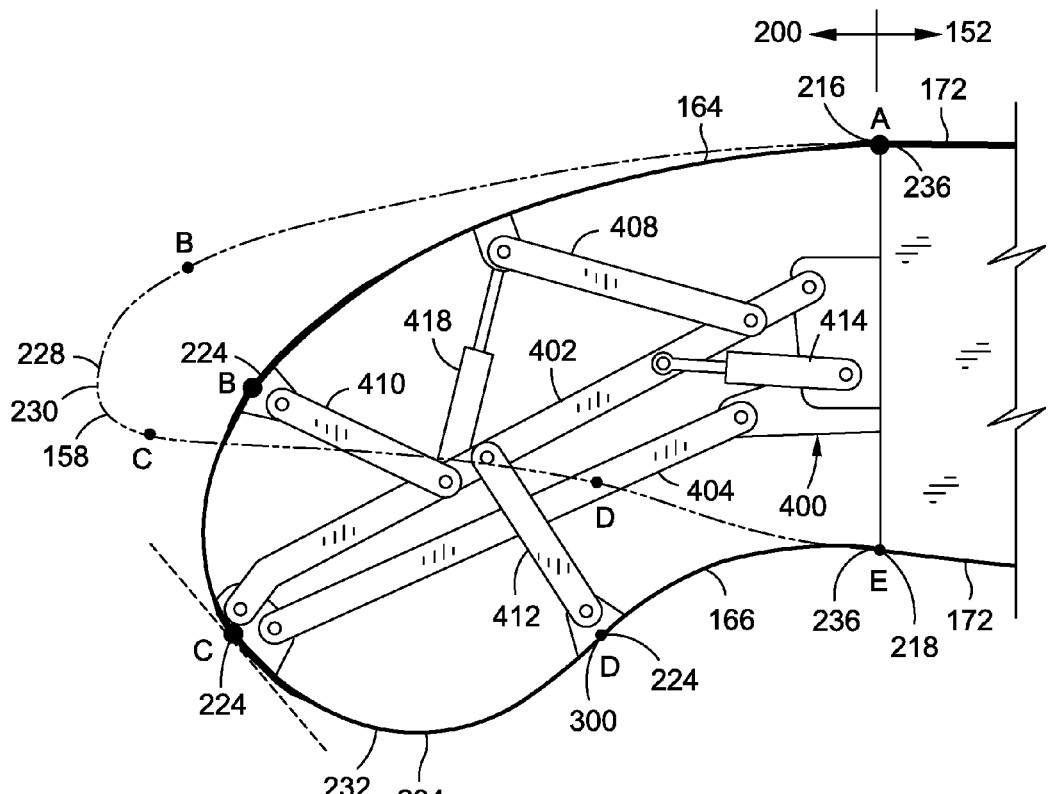
FIG. 26 is a sectional view of the shape control mechanism of FIG. 25 showing the leading edge in a second shape.

FIGS. 25-26 show an embodiment of a shape control mechanism 400 having a locking mechanism 418 for locking the flexible leading edge skin 214 in any one of a variety of deployment positions. The locking mechanism 418 may be pivotably mounted to the main arm 402 and may extend upwardly toward the leading edge skin 214. The upper end of the locking mechanism 418 may be coupled to any location on the leading edge skin 214 such as a location where another link is coupled to the leading edge skin 214. In some embodiments, the locking mechanism 418 may be configured as a length-adjustable actuator. For example, the locking mechanism 418 may include a piston linearly slidable within a cylinder to vary the length of the locking mechanism 418. The locking mechanism 418 may be lockable at any length and may assist the main actuator 414 of the shape control mechanism 400 in preventing movement of the arms and/or links to thereby maintain the leading edge 200 in the first shape 228, the second shape 232, or in any shape therebetween. When the locking mechanism 418 is locked, the combination of the locking mechanism 418 with the main arm 402 and the other links may form a truss for increasing structural support of the leading edge 200.

FIG. 27 shows an aircraft wing 106 with a plurality of shape control mechanisms 400 located at spaced intervals along a spanwise direction of the wing 106. The shape control mechanisms 400 may be provided in any spacing along the leading edge 200 of an airfoil 150. In some embodiments, an airfoil 150 such as an aircraft wing 106 may be provided with a single, continuous leading edge 200 extending along a substantial portion of a wing. In other embodiments, multiple leading edge 200 segments may be provided and may be independently movable in order to vary the wing camber along a spanwise direction to facilitate drag reduction and/or for load alleviation of the wing 106. However, as indicated above, the leading edge 200 disclosed herein may be implemented on any airfoil 150 of any vehicular or non-vehicular application, without limitation, and is not limited to implementation on an aircraft wing 106.

FIG. 28 shows a portion of an aircraft wing 106 illustrating spanwise stiffeners 420 that may optionally be included with the leading edge 200 to increase the bending stiffness of the leading edge skin 214 along a spanwise direction. In one embodiment, one or more spanwise stiffeners 420 that may be extended between unsupported sections of the leading edge such as between pairs of shape control mechanisms 400. The spanwise stiffeners 420 may resist deflection of the leading edge skin 214 in the span-wise direction under air loads on the upper and/or lower surfaces 164, 166 (FIG. 29) of the leading edge 200.

FIG. 29 shows a section of an aircraft wing 106 and illustrating an embodiment of a leading edge 200 having spanwise stiffeners 420 mounted to the inner side 222 of the flexible leading edge skin 214. In some examples, the spanwise stiffeners 420 may be spaced apart in a chordwise direction of the leading edge skin 214. The spanwise stiffeners 420 may be separately formed and may be attached or mounted to the inner side 222 of the leading edge skin 214 such as by mechanical fastening, adhesive bonding, or using other means. In some embodiments, the spanwise stiffeners 420 may be integrally formed with the leading edge skin 214. For example, one or more spanwise stiffeners 420 may be integrally machined into the inner side 222 of a metallic leading edge skin 214. In other embodiments, the spanwise stiffeners 420 may be formed of composite material (e.g. graphite/epoxy) and may be co-bonded or co-cured with a composite laminate leading edge skin 214.

The spanwise stiffeners 420 may be provided in any one of a variety of different sizes, shapes, and geometries including, but not limited to, a blade section, an I-section, a hat section, or in other shapes. The spanwise stiffeners 420 may be configured such that the local bending stiffness of the leading edge skin 214 along the arc length direction is substantially unaffected by the manner in which the spanwise stiffeners 420 are coupled to the leading edge skin 214. In this regard, the spanwise stiffeners 420 may be attached to the leading edge skin 214 in a manner that prevents faceting or flat spots in the leading edge skin 214 during morphing from the first shape 228 to the second shape 232.

Figure 30:
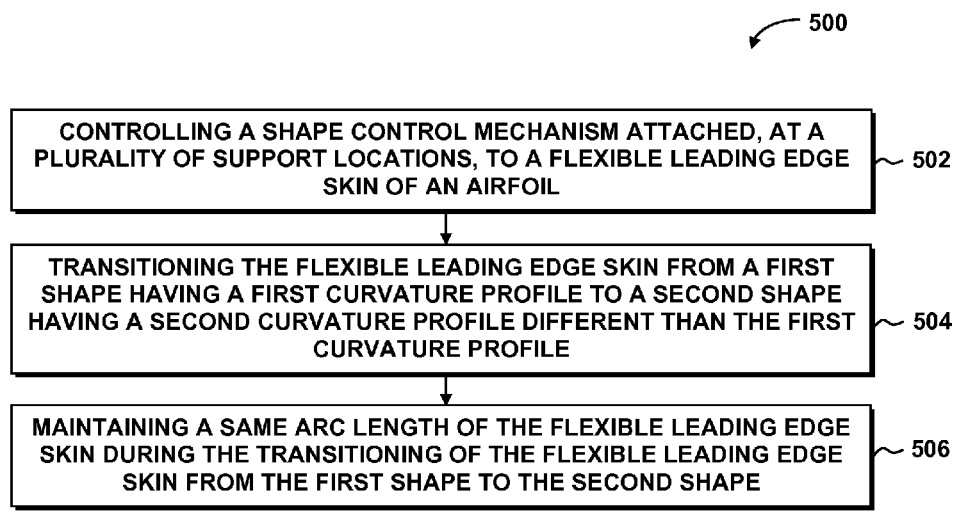
FIG. 30 is a flowchart having one or more operations that may be included in a method of morphing a leading edge of an airfoil.

FIG. 30 shows a flowchart including one or more operations that may be implemented in a method 500 of morphing a leading edge 200 of an airfoil 150. Step 502 of the method 500 may include controlling a shape control mechanism 400 attached to a flexible leading edge skin 214 of the airfoil 150. For example, the shape control mechanism 400 may include one or more arms and/or links that may be attached of the leading edge skin 214 at a plurality of support locations 224 on the inner side 222 the leading edge skin 214. As indicated above, the shape control mechanism 400 may include a main arm 402 and a rotation arm 404 that may extend from the airfoil main portion 152 to one or more support locations 224 on the inner side 222 of the leading edge skin 214. One or more links may be extended from the main arm 402 to the leading edge skin 214 at support locations 224 and/or at other locations between support locations 224. One or more main actuators 414 may be operatively coupled to one or more of the arms for pivotably moving the arms.

Step 504 of the method 500 may include transitioning the flexible leading edge skin 214 from a first shape 228 having a first curvature profile 230 to a second shape 232 having a second curvature profile 234 that may be different than the first curvature profile 230. For example, FIGS. 4-8 illustrate the progression of the morphing of the leading edge 200 from a first shape 228 (FIG. 4) to a second shape 232 (FIG. 8). The method 500 may include changing a camber of the airfoil 150 from a first camber 168 suitable for cruise flight such as when the leading edge 200 is the first shape 228, to a second camber 170 suitable for low-speed flight such as when the leading edge 200 is in the second shape 232. The method may additionally include the step of reducing the camber of the airfoil 150 by transitioning the flexible leading edge skin 214 from the second shape 232 to a third shape 240 (FIG. 6). For example, the shape control mechanism 400 may be configured to morph the leading edge 200 from the second shape 232 having a drooped profile, to a third shape 240 that is intermediate the shape of the leading edge in the first shape 228 and the second shape 232.

In some embodiments, the method may include forming a reflex 300 of curvature in the flexible leading edge skin 214 from concave 302 to convex 304 when transitioning the flexible leading edge skin 214 into the first shape 228 and/or the second shape 232. As indicated above, a reflex 300 in curvature in the flexible leading edge skin 214 may be described as the location of a change in curvature from concave 302 to convex 304 along a direction of the arc length. FIGS. 4-8 illustrate the progression of the forming of the reflex 300 at point D of the leading edge skin 214 during the transition of the leading edge 200 from the first shape 228 the second shape 232. In some embodiments, the leading edge 200 may be configured such that at least one of the support locations 224 is a location of constant curvature of the leading edge skin 214. In some examples, the leading edge 200 may be configured such that a reflex 300 is formed at the lower surface 166 in the cruise configuration, as indicated above. The leading edge skin 214 may be configured such that the reflex 300 is naturally formed in the leading edge skin 214 without the need for controlling the slope and/or displacement of the reflex 300. However, an arm of the shape control mechanism 400 may be attached to Point D to support the leading edge skin 214 against aerodynamic loads.

Step 506 of the method may include maintaining the same arc length of the flexible leading edge skin 214 during the transitioning of the flexible leading edge skin 214 from the first shape 228 to the second shape 232. As shown in the figures, the flexible leading edge skin 214 includes a first end 216 and a second end 218 which represent locations where the leading edge skin 214 transitions into the airfoil main portion 152. The method may include maintaining the tangency of the outer surface 220 of the flexible leading edge skin 214 to the outer surface 172 of the airfoil main portion 152 on both sides of the airfoil 150 during the transition of the flexible leading edge skin 214 from the first shape 228 to the second shape 232. In addition, the method may include enforcing the displacement and/or the slope change of the flexible leading edge skin 214 for at least one of the support locations 224 during the transition of the flexible leading edge skin 214 from the first shape 228 to the second shape 232. For example, FIGS. 4-8 illustrate a support location 224 at point C for which the displacement and slope may be enforced by the shape control mechanism 400.

The method 500 may include maintaining the same curvature in the flexible leading edge skin 214 for least one of the support locations 224 during transitioning of the flexible leading edge skin 214 from the first shape 228 to the second shape 232. For example, FIGS. 4-8 illustrate points B, C, and D which are locations of constant curvature during transitioning of the leading edge 200 from the first shape 228 to the second shape 232. Control of the displacement and/or slope of the leading edge skin 214 may be facilitated by controlling the shape control mechanism 400. In some embodiments, the method may include engaging a locking mechanism 418 to assist in preventing movement of the shape control mechanism 400. The locking mechanism 418 may prevent movement of one or more arms and/or links which may assist the main actuator 414 of the shape control mechanism 400 in maintaining the leading edge 200 in any one of a variety of different shapes including the first shape 228 and the second shape 232.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. An airfoil, comprising:
   a leading edge including a flexible leading edge skin having a first end, a second end, and an arc length defined therebetween, the first end and the second end being constrained locations of the flexible leading edge skin;
   a shape control mechanism attached to the flexible leading edge skin at a plurality of discrete, fixed support locations and configured to transition the flexible leading edge skin from a first shape having a first curvature profile to a second shape having a second curvature profile different than the first curvature profile without a change in the arc length; and
   the shape control mechanism including at least one main arm and at least one rotation arm each directly connected to and extending from an airfoil main portion and coupled to a same support location in a manner such that when the shape control mechanism transitions the leading edge skin from the first shape to the second shape:
   the main arm enforces a displacement of the leading edge skin at the same support location; and
   the rotation arm enforces a slope change of the leading edge skin at the same support location.

2. The airfoil of claim 1, further comprising:
   the airfoil main portion adjacent to the leading edge, the first and second end of the leading edge fixedly coupled to the airfoil main portion; and
   an outer surface of the flexible leading edge skin continuous from a first side of the airfoil main portion to a second side of the airfoil main portion.

3. The airfoil of claim 1, further comprising:
   the airfoil main portion adjacent the leading edge; and
   an outer surface of the flexible leading edge skin tangent to an outer surface of the airfoil main portion on both sides of the airfoil when the flexible leading edge skin is in the first shape and in the second shape.

4. The airfoil of claim 1, wherein:
   the flexible leading edge skin is formed of an isotropic material.

5. The airfoil of claim 4, wherein:
the isotropic material has a thickness varying along the arc length in a manner causing the bending stiffness of the flexible leading edge skin to vary along the arc length.

6. The airfoil of claim 1, wherein:
the flexible leading edge skin is formed of composite material.

7. The airfoil of claim 6, wherein:
the composite material is a composite laminate formed of composite plies of fiber-reinforced polymer matrix material.

8. The airfoil of claim 7, wherein:
each one of the composite plies has a fiber orientation; and
the fiber orientation of at least one of the composite plies varying along the arc length in a manner causing the bending stiffness of the flexible leading edge skin to vary along the arc length.

9. The airfoil of claim 1, wherein:
respective portions of the flexible leading edge skin at respective ones of the plurality of support locations have a same curvature in the first shape and in the second shape.

10. The airfoil of claim 1, wherein:
a first portion of the flexible leading edge skin at a first one of the plurality of support locations has a higher bending stiffness relative to a bending stiffness of a second portion of the flexible leading edge skin at a second one of the plurality of support locations.

11. The airfoil of claim 1, wherein:
the shape control mechanism is configured to control a displacement and a slope of respective portions of the flexible leading edge skin at respective ones of the plurality of support locations.

12. The airfoil of claim 1, wherein:
the main arm extends to a support location on a forward lower portion of the flexible leading edge skin and is configured to control a displacement of a forward lower point on the forward lower portion;
the rotation arm extends to the support location where the main arm is coupled to the forward lower portion and is configured to control a slope of the forward lower point;
the shape control mechanism including one or more links extending from the main arm to one or more locations on an inner side of the flexible leading edge skin, the links including:
an upper link pivotably coupled to the main arm and extending to a forward upper portion of the flexible leading edge skin and configured to control a displacement of a forward upper point on the forward upper portion; and
a lower link pivotably coupled to the main arm and extending to a mid lower portion of the flexible leading edge skin at a location between the forward lower portion and the airfoil main portion and configured to control a displacement of a mid lower point on the mid lower portion; and
the shape control mechanism including an actuator extending from the airfoil main portion and pivotably coupled to at least one of the arms for transitioning the flexible leading edge skin between the first shape and the second shape.

13. An aircraft, comprising:
an airfoil;
a leading edge disposed on the airfoil and including a flexible leading edge skin having a first end, a second end, and an arc length defined therebetween, the first end and the second end being constrained locations of the flexible leading edge skin; and
a shape control mechanism attached to the flexible leading edge skin at a plurality of discrete, fixed support locations and configured to transition the flexible leading edge skin from a first shape having a first curvature profile to a second shape having a second curvature profile different than the first curvature profile without a change in the arc length;
the shape control mechanism including at least one main arm and at least one rotation arm each directly connected to and extending from an airfoil main portion and coupled to a same support location in a manner such that when the shape control mechanism transitions the leading edge skin from the first shape to the second shape:
the main arm enforces a displacement of the leading edge skin at the same support location; and
the rotation arm enforces a slope change of the leading edge skin at the same support location.

14. A method of morphing a leading edge of an airfoil, comprising:
controlling a shape control mechanism attached, at a plurality of discrete, fixed support locations, to a flexible leading edge skin of the airfoil, the shape control mechanism including at least one main arm and at least one rotation arm each directly connected to and extending from an airfoil main portion and coupled to a same support location of the plurality of discrete, fixed support locations, the flexible leading edge skin having a first end, a second end, and an arc length defined therebetween, the first end and the second end being constrained locations of the flexible leading edge skin;
transitioning the flexible leading edge skin from a first shape having a first curvature profile to a second shape having a second curvature profile different than the first curvature profile; and
maintaining the arc length of the flexible leading edge skin when transitioning the flexible leading edge skin from the first shape to the second shape; and
enforcing, using the main arm and the rotation arm, a respective displacement and a slope change of the leading edge skin at the same support location when transitioning the leading edge skin from the first shape to the second shape.

15. The method of claim 14, further comprising:
forming a reflex of curvature in the flexible leading edge skin from concave to convex when transitioning the leading edge skin into the first shape and/or the second shape.

16. The method of claim 14, wherein the airfoil further includes an airfoil main portion, the method further comprising:
maintaining a tangency of an outer surface of the leading edge skin to an outer surface of the airfoil main portion on both sides of the airfoil during the transitioning of the flexible leading edge skin from the first shape to the second shape.

17. The method of claim 14, further comprising:
changing a camber of the airfoil from a first camber suitable for cruise flight to a second camber suitable for low-speed flight.

18. The method of claim 17, further comprising:
reducing a camber of the airfoil by transitioning the flexible leading edge skin from the second shape to a third shape.

19. The method of claim 14, wherein the shape control mechanism includes a plurality of links extending from an airfoil main portion of the airfoil to respective ones of the plurality of support locations, the method further comprising:

controlling one or more links to control a displacement and/or a slope change of the leading edge skin for at least one of the support locations.

20. The method of claim 19, further comprising:

engaging a locking mechanism to prevent movement of the arms and links.

* * * * *